United States Patent
Son et al.

(10) Patent No.: US 10,197,326 B2
(45) Date of Patent: Feb. 5, 2019

(54) DOOR OPENING AND CLOSING DEVICE FOR REFRIGERATOR AND METHOD OF CONTROLLING THE SAME

(71) Applicant: LG ELECTRONICS INC., Seoul (KR)

(72) Inventors: Changwoo Son, Seoul (KR); Cholok Han, Seoul (KR); Myoungju Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 15/508,801

(22) PCT Filed: Sep. 4, 2015

(86) PCT No.: PCT/KR2015/009386
§ 371 (c)(1),
(2) Date: Mar. 3, 2017

(87) PCT Pub. No.: WO2016/036213
PCT Pub. Date: Mar. 10, 2016

(65) Prior Publication Data
US 2017/0261252 A1    Sep. 14, 2017

(30) Foreign Application Priority Data
Sep. 5, 2014    (KR) .................. 10-2014-0119167

(51) Int. Cl.
| | |
|---|---|
| *F25D 23/02* | (2006.01) |
| *E05F 15/614* | (2015.01) |
| *E05F 15/619* | (2015.01) |
| *F25D 11/00* | (2006.01) |
| *F25D 29/00* | (2006.01) |
| *H02P 6/182* | (2016.01) |

(52) U.S. Cl.
CPC .......... *F25D 23/028* (2013.01); *E05F 15/614* (2015.01); *E05F 15/619* (2015.01);
(Continued)

(58) Field of Classification Search
USPC ....... 318/264–266, 272, 275, 277, 282, 286, 318/466–469, 626
See application file for complete search history.

(56) References Cited

U.S. PATENT DOCUMENTS

| | | |
|---|---|---|
| 4,727,679 A | 3/1988 | Kornbrekke et al. |
| 5,801,502 A | 9/1998 | Monzen |

(Continued)

FOREIGN PATENT DOCUMENTS

| | | |
|---|---|---|
| JP | 2005120697 A | 5/2005 |
| KR | 10-2010-0064022 | 6/2010 |

OTHER PUBLICATIONS

European Extended Search Report in European Application No. 15837369.6, dated Apr. 24 2018, 8 pages.
(Continued)

*Primary Examiner* — Bentsu Ro
(74) *Attorney, Agent, or Firm* — Fish & Richardson P.C.

(57) ABSTRACT

A door opening and closing device for a refrigerator includes a door coupled to a main body, an opening and closing unit including a drive unit for generating rotational force by means of a motor and a door rotating mechanism for opening or closing the door, a device for measuring a back electromotive force generated from the motor, a power circuit connected for supplying power to the motor, a circuit for transmitting back electromotive force of the motor to the device, a control switch for selectively connecting the motor to the circuit or the power circuit, and a control unit for connecting the control switch to the power circuit when the motor is activated, and connecting the control switch to the circuit and opening or closing the door when the motor is deactivated, wherein the control unit closes the door when a predetermined back electromotive force is input to the device.

20 Claims, 21 Drawing Sheets

(52) U.S. Cl.
CPC .............. *F25D 11/00* (2013.01); *F25D 29/00* (2013.01); *E05Y 2201/214* (2013.01); *E05Y 2201/22* (2013.01); *E05Y 2201/244* (2013.01); *E05Y 2201/426* (2013.01); *E05Y 2800/00* (2013.01); *E05Y 2800/11* (2013.01); *E05Y 2900/31* (2013.01); *F25D 2323/024* (2013.01); *F25D 2700/02* (2013.01); *H02P 6/182* (2013.01)

(56) References Cited

U.S. PATENT DOCUMENTS

| | | | |
|---|---|---|---|
| 6,270,175 B1* | 8/2001 | Sfeir | E05B 17/0033 |
| | | | 280/291 |
| 8,099,970 B2 | 1/2012 | Cho et al. | |
| 8,162,421 B2 | 4/2012 | Lim et al. | |
| 2010/0141107 A1 | 6/2010 | Kim et al. | |
| 2011/0087376 A1 | 4/2011 | Kim | |
| 2011/0307098 A1* | 12/2011 | Ennis | G10L 15/26 |
| | | | 700/275 |
| 2014/0013784 A1 | 1/2014 | Park et al. | |
| 2016/0076295 A1* | 3/2016 | Boyd | E05F 13/02 |
| | | | 49/264 |

OTHER PUBLICATIONS

Korean Notice of Allowance in Korean Application No. 10-2014-0119167, dated Feb. 29, 2017, 2 pages.
International Search Report in International Application No. PCT/KR2015/009386, dated Jan. 7, 2016, 2 pages.

\* cited by examiner

[Figure 1]
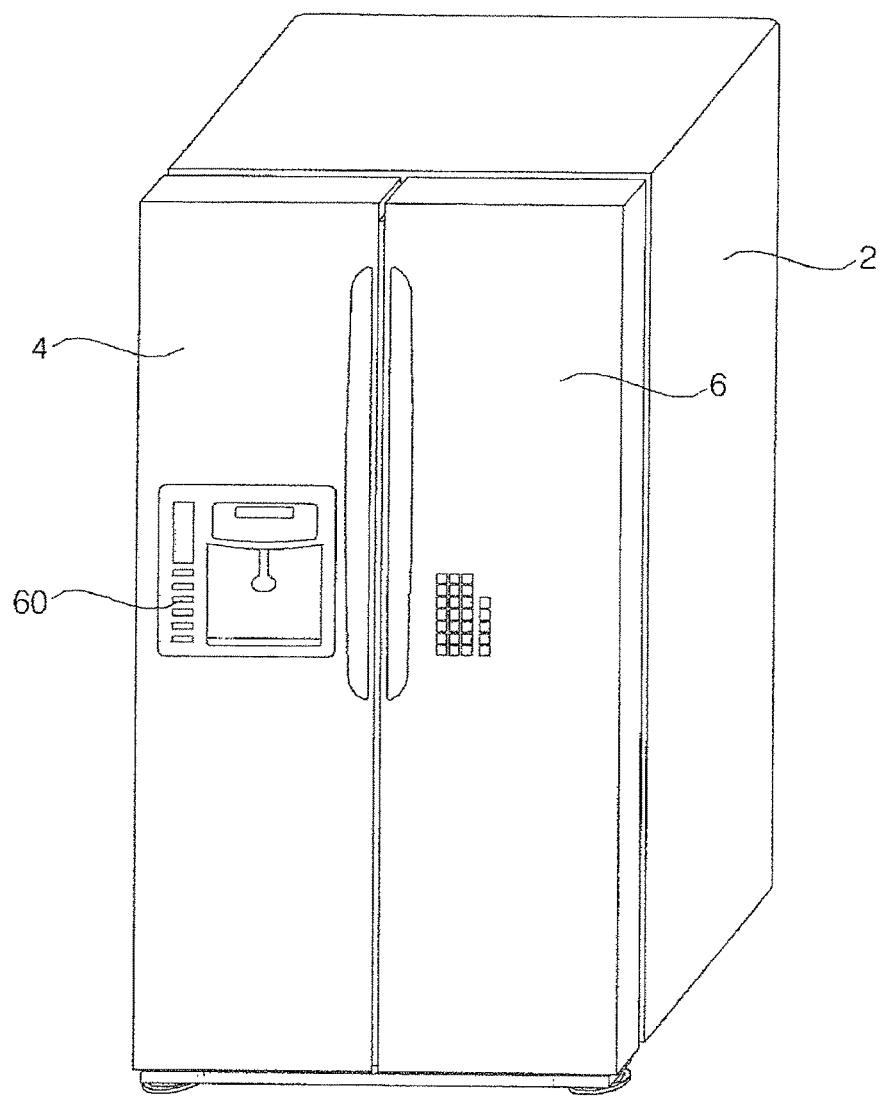

[Figure 2]
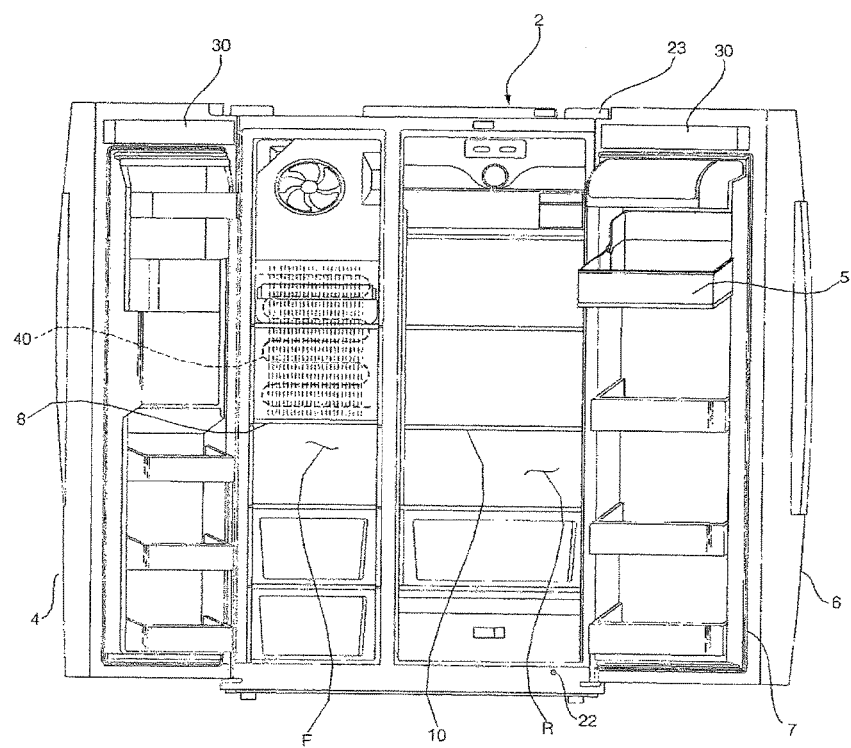

[Figure 3]
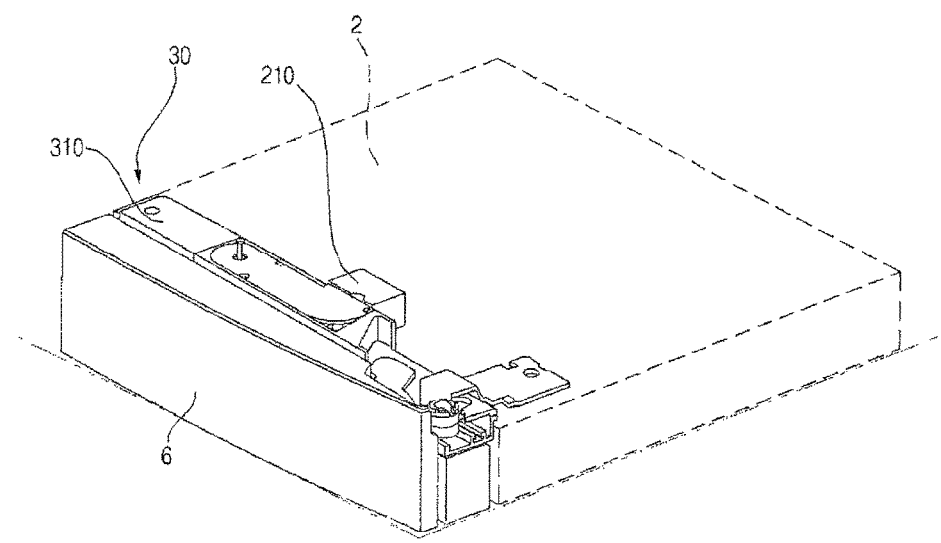

[Figure 4]
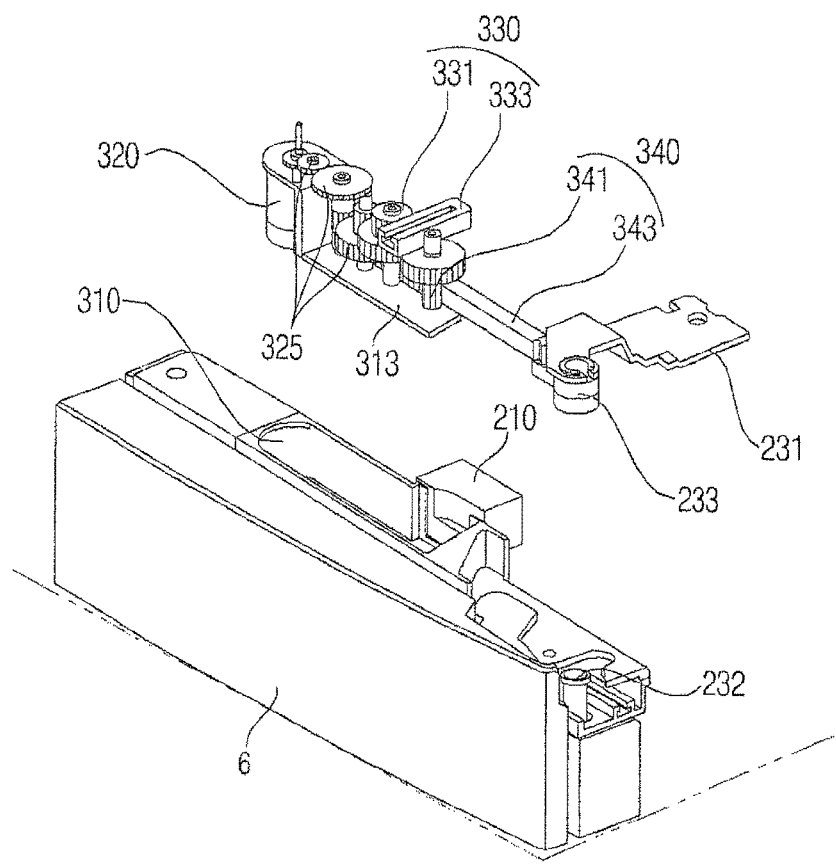

[Figure 5]
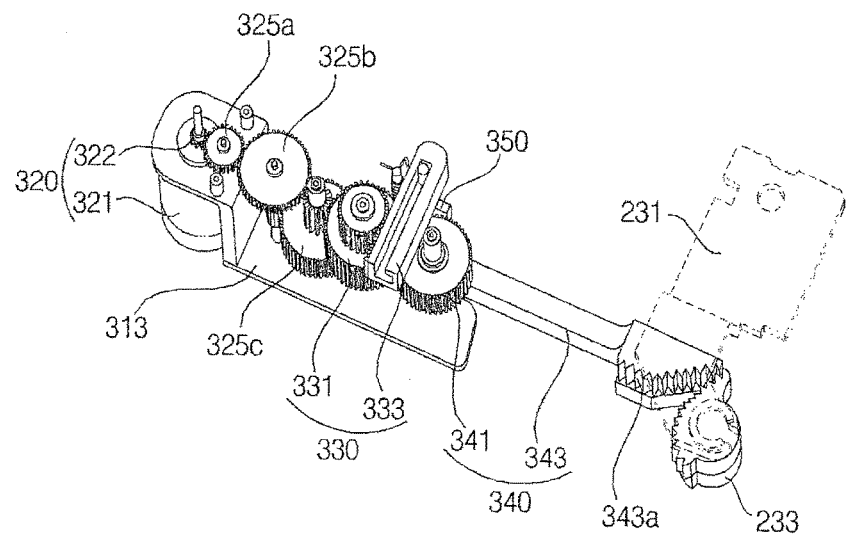
[Figure 6]
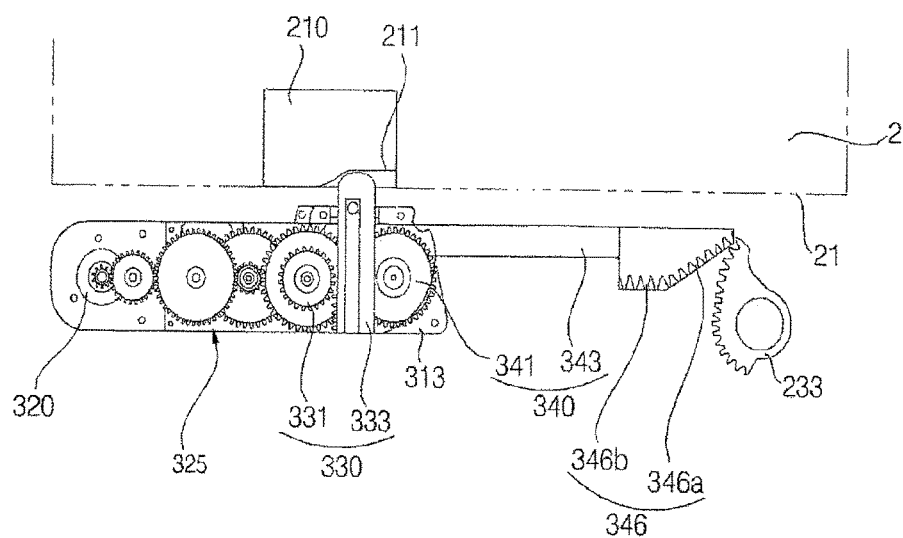

[Figure 7]
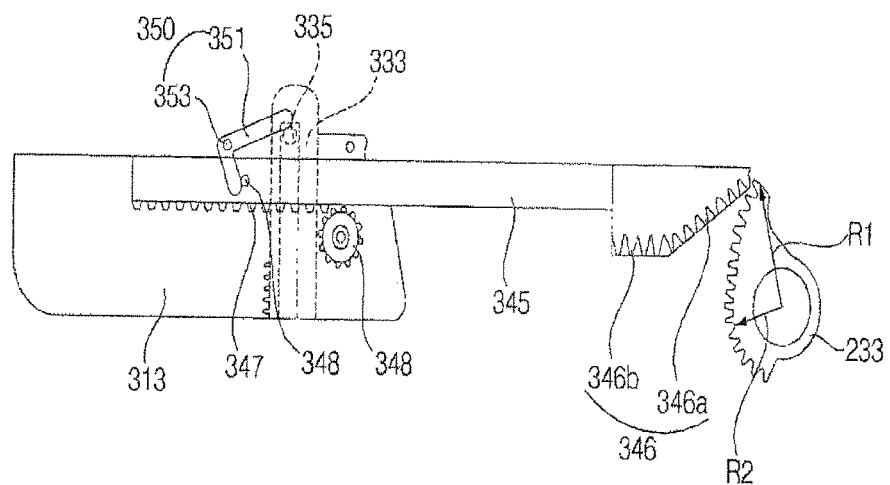

[Figure 8]
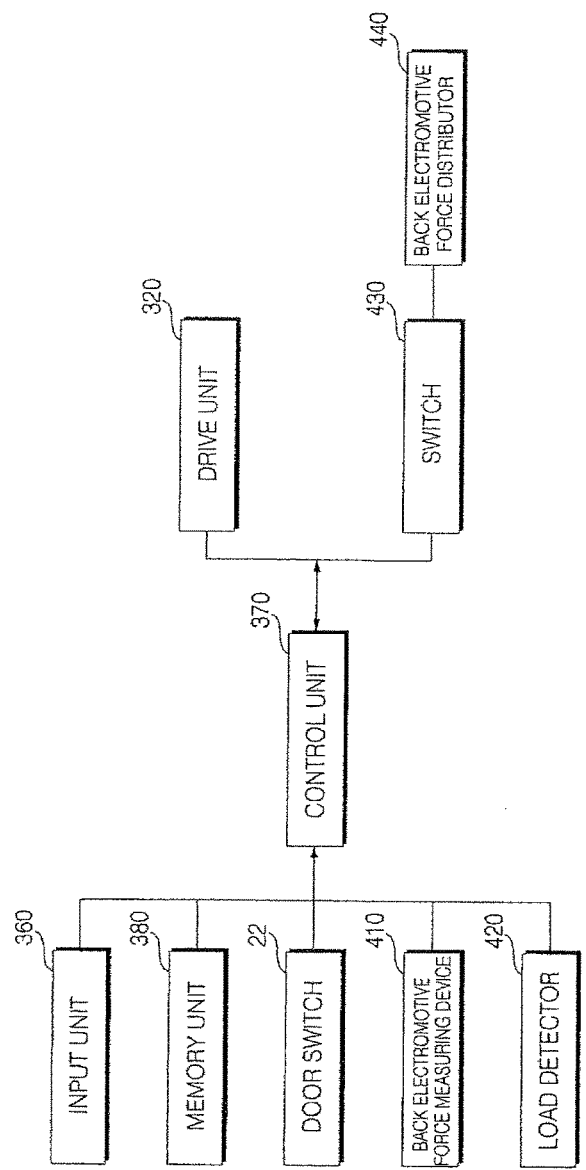

[Figure 9]
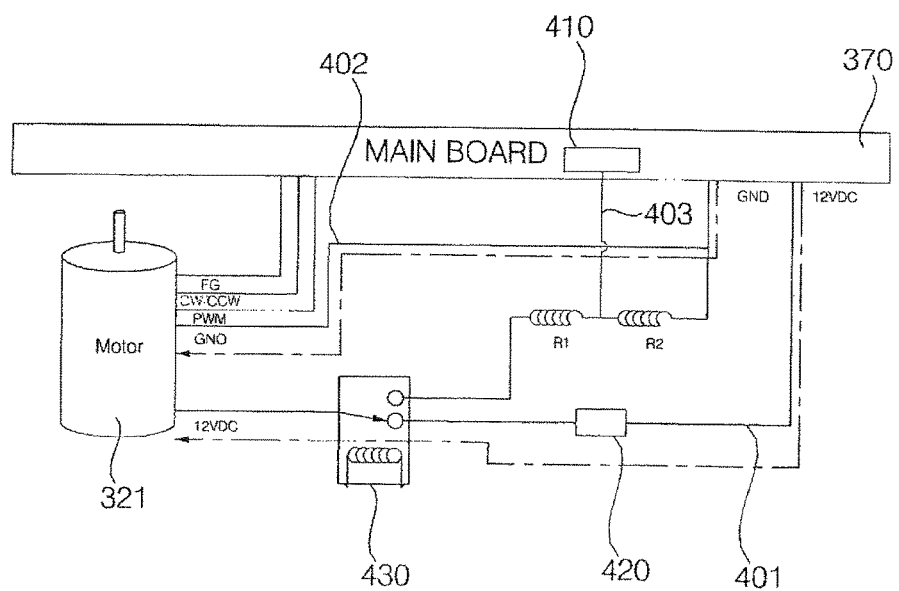

[Figure 10]
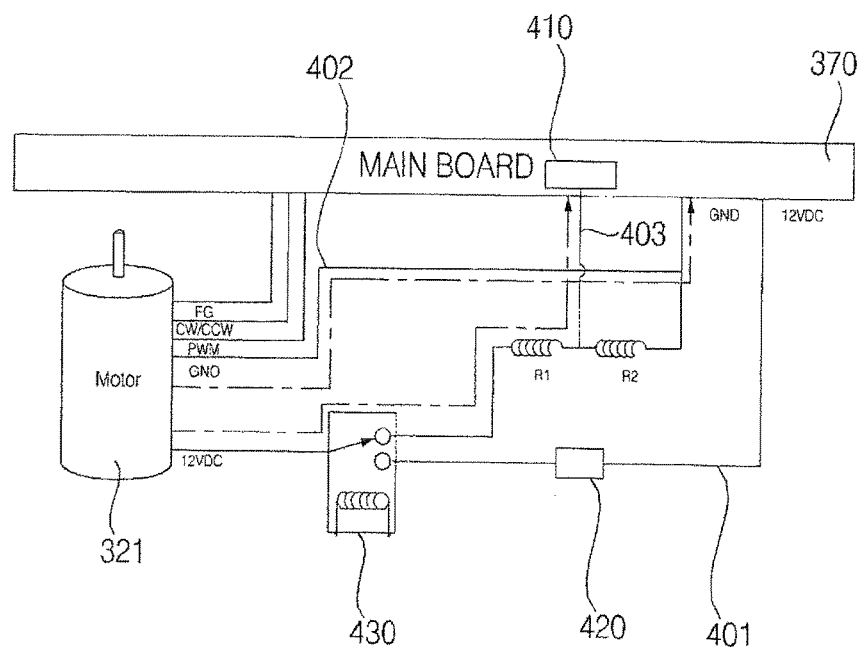

[Figure 11]
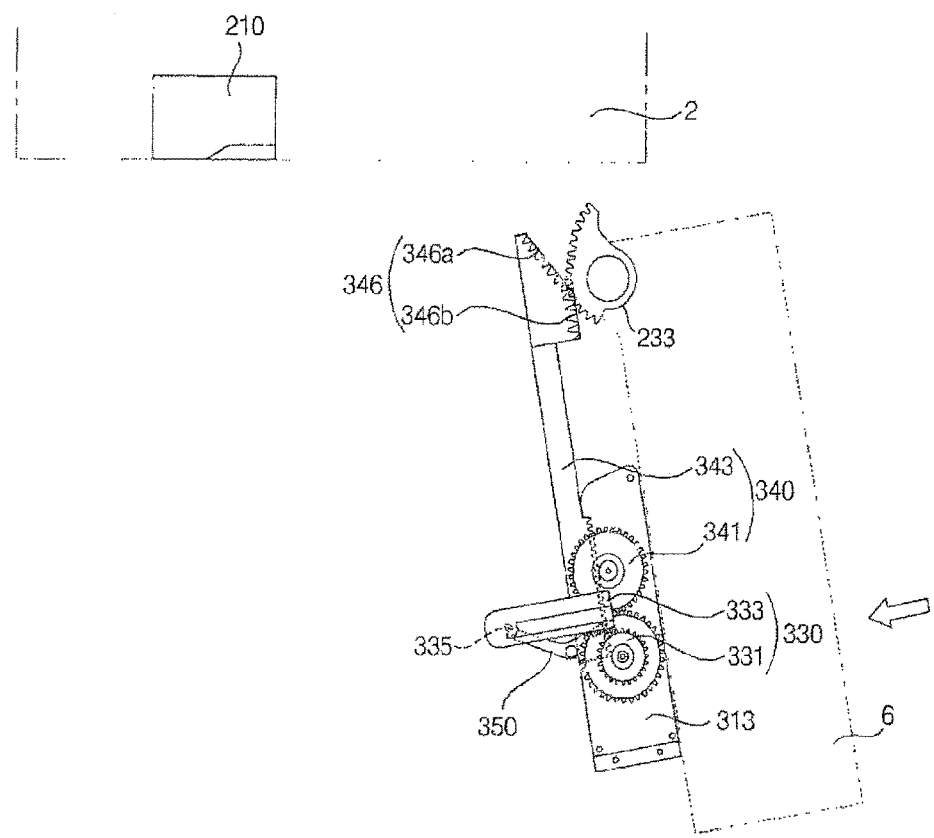

[Figure 12]
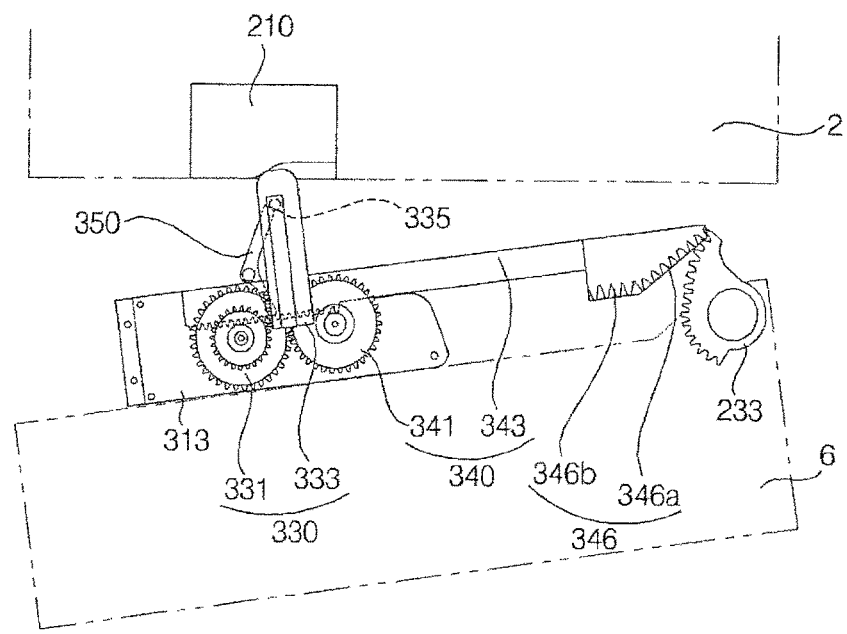

[Figure 13]
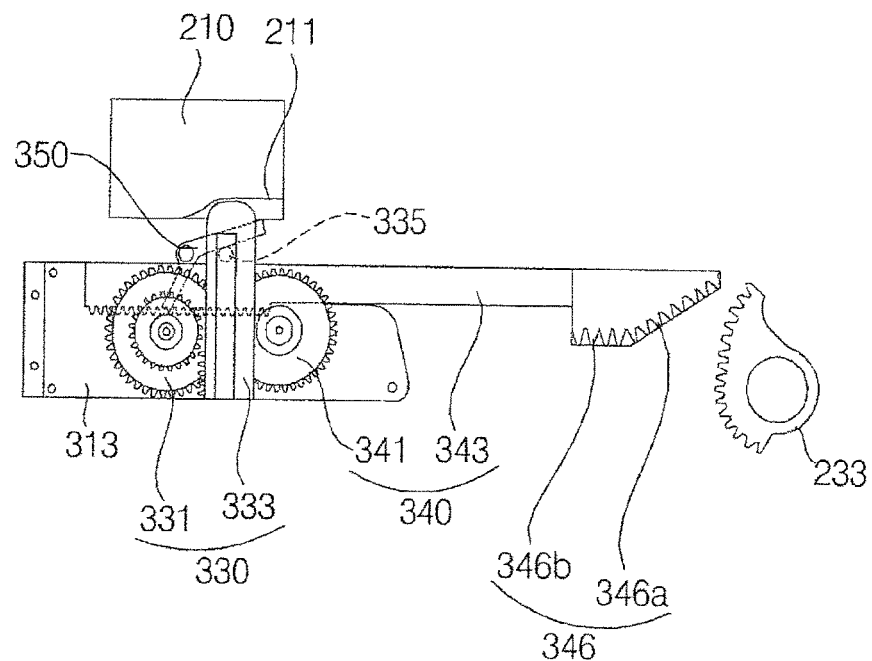
[Figure 14]
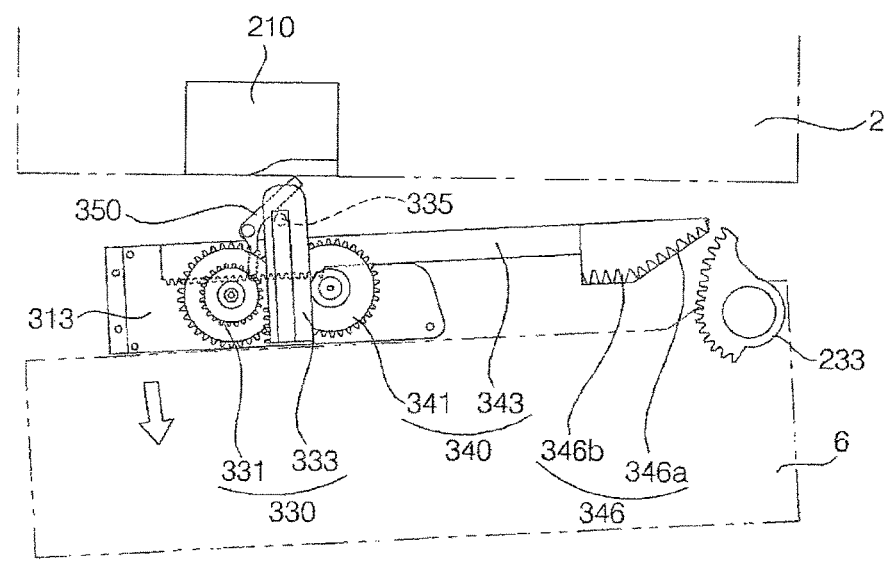

[Figure 15]
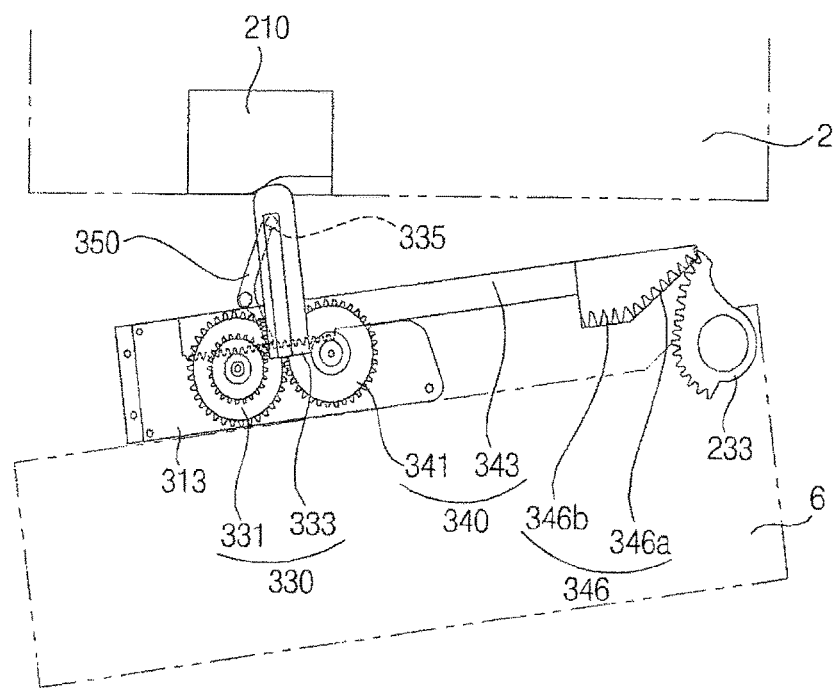

[Figure 16]
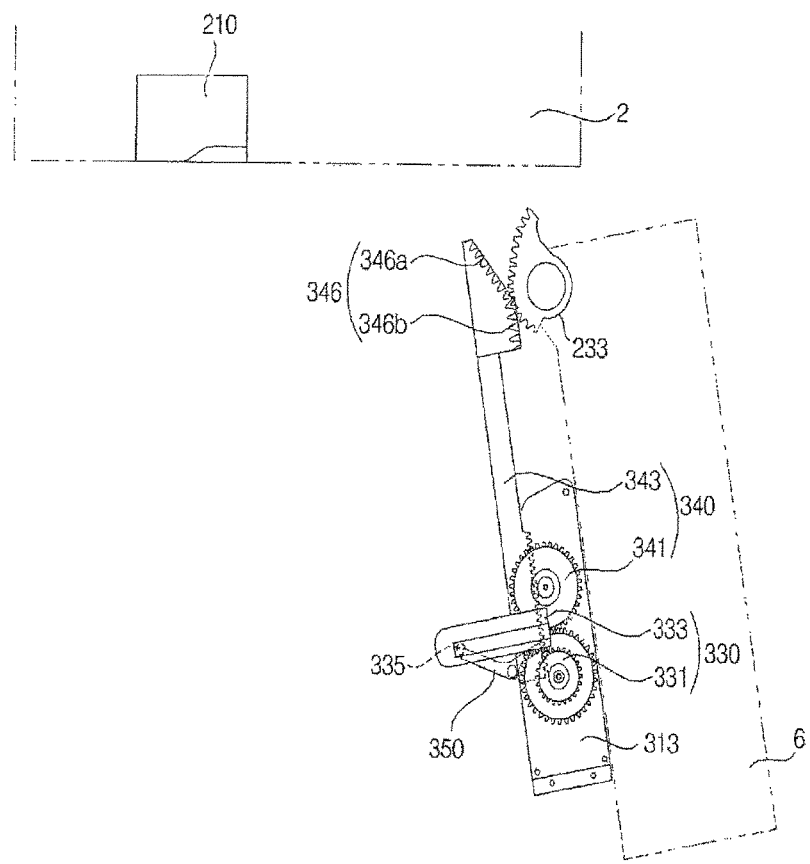

[Figure 17]
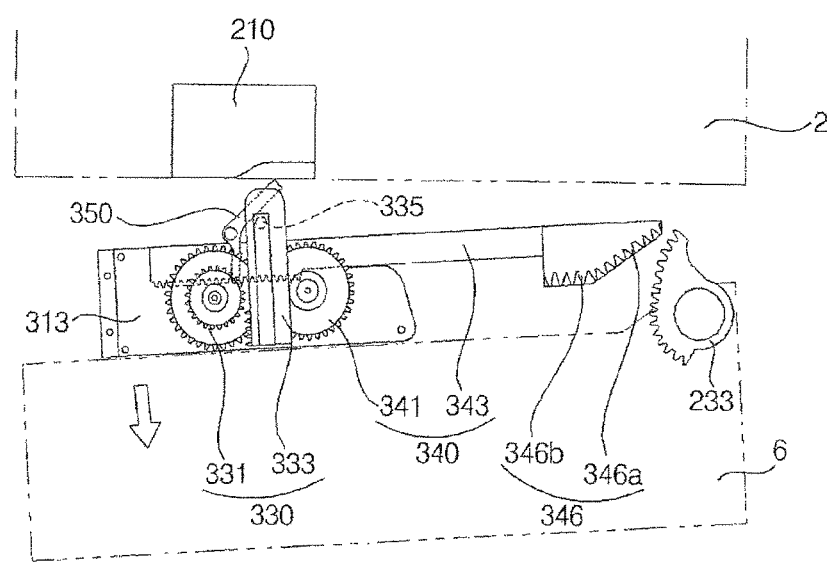

[Figure 18]
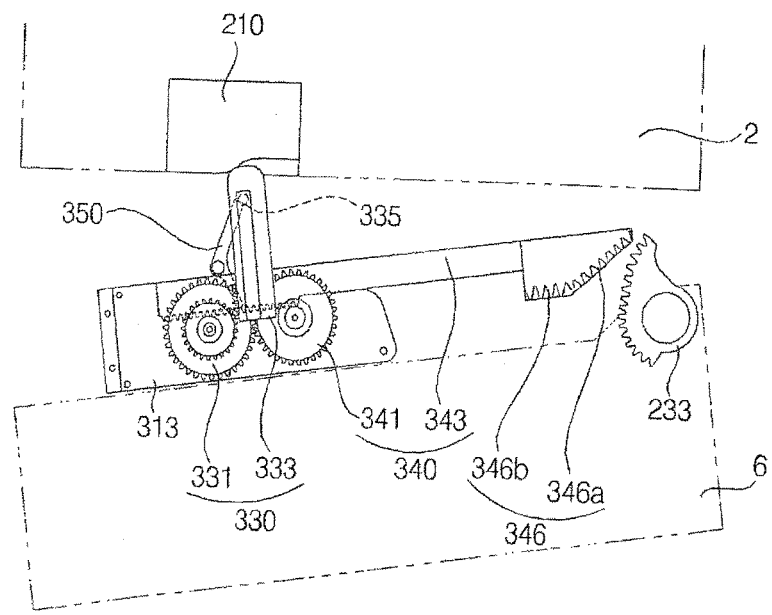

[Figure 19]
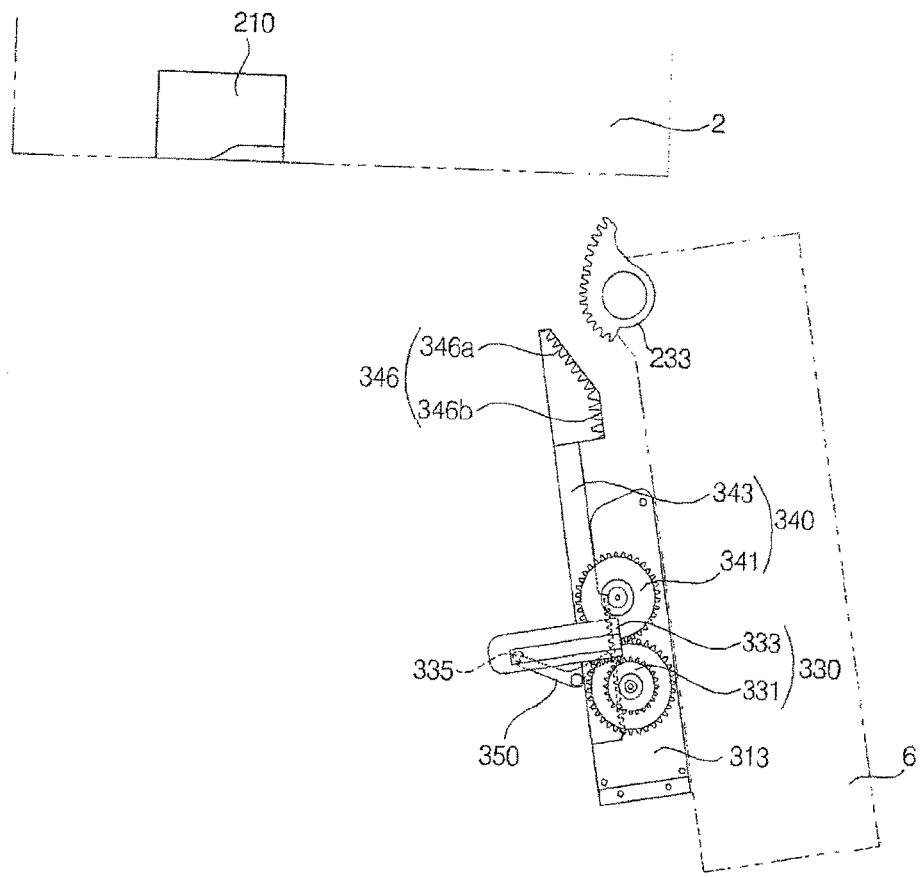

[Figure 20]
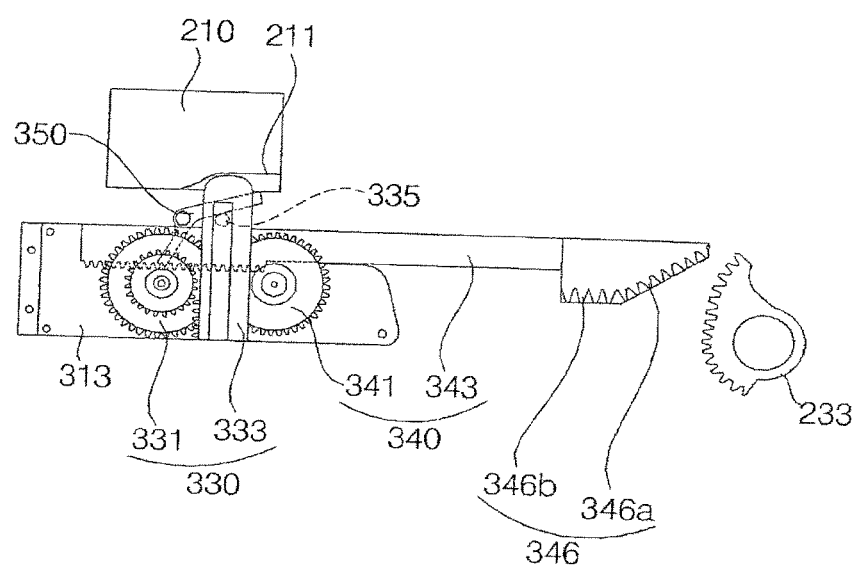

[Figure 21]
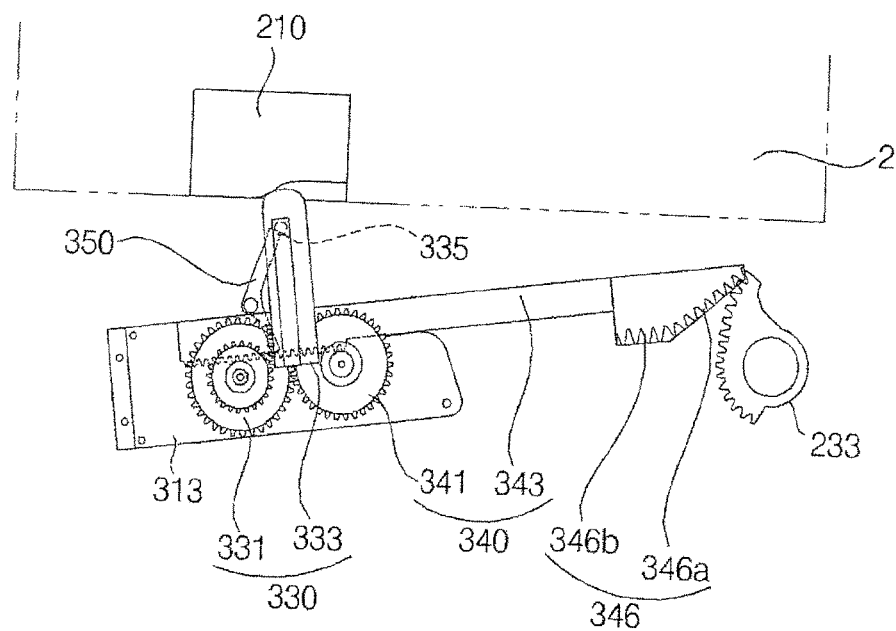

【Figure 22】
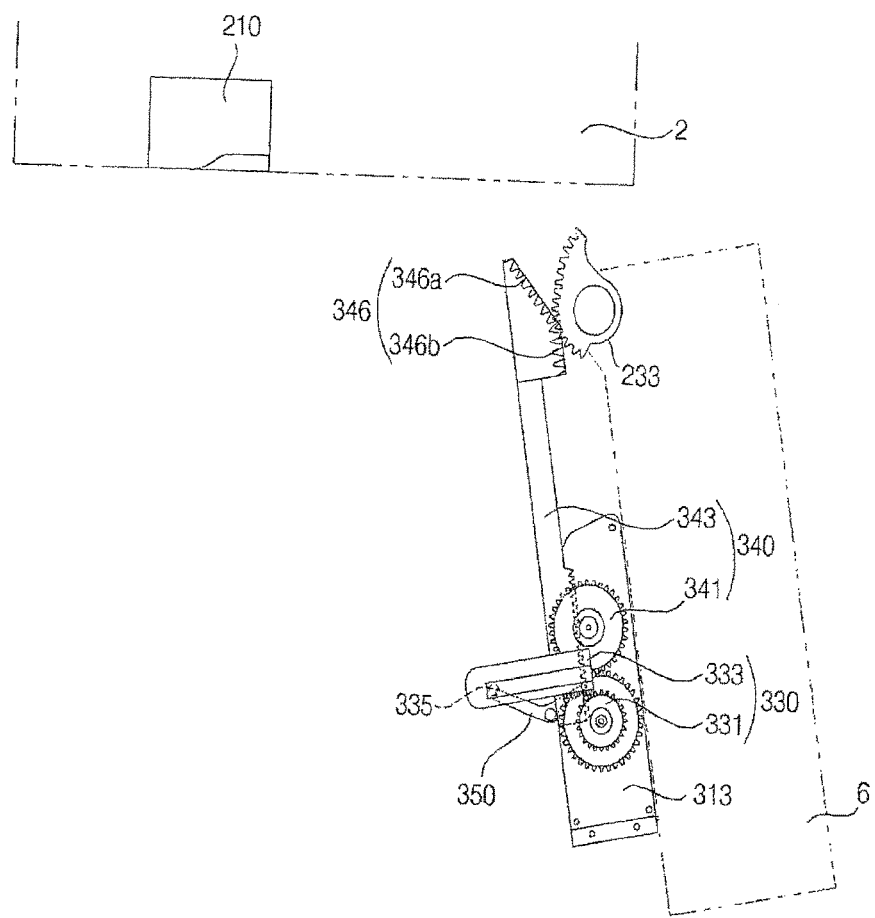

[Figure 23]
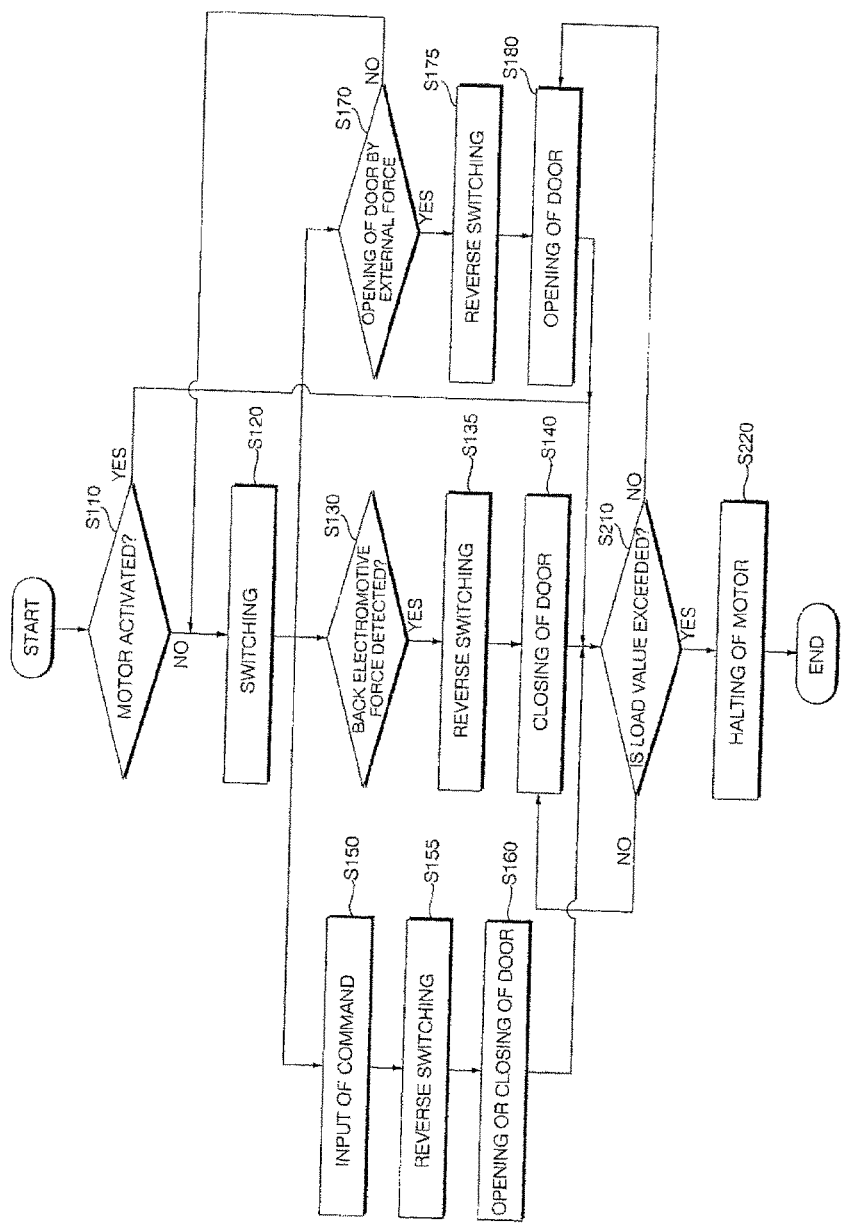

DOOR OPENING AND CLOSING DEVICE FOR REFRIGERATOR AND METHOD OF CONTROLLING THE SAME

CROSS REFERENCE TO RELATED APPLICATIONS

This application is a U.S. National Phase Application under 35 U.S.C. § 371 of International Application PCT/KR2015/009386, filed on Sept. 4, 2015, which claims the benefit of Korean Application No. 10-2014-0119167, filed on Sept. 5, 2014, the entire contents of which are hereby incorporated by reference in their entireties.

TECHNICAL FIELD

The present invention relates to a door opening and closing device for a refrigerator and a method of controlling the same.

BACKGROUND ART

In general, a refrigerator is an apparatus for storing objects to be kept in a fresh state for a long period of time using cool air supplied into a storage compartment. The cool air supplied into the storage compartment is created through heat exchange with a refrigerant. The cool air supplied into the storage compartment is uniformly distributed throughout the storage compartment by convection so that foodstuffs can be stored at a desired temperature.

The storage compartment is defined in a main body that forms the appearance of the refrigerator. The storage compartment is open at the front thereof such that foodstuffs can be received through the opening. A door for opening or closing the storage compartment is mounted at the front of the storage compartment. The door is hinged to the main body to open or close the storage compartment.

In order to prevent the leakage of cold air to the outside and to ensure close contact between the main body and the door, a gasket is disposed between the main body and the door.

The gasket is typically magnetic in order to improve sealing performance.

In order to open the door automatically, it is necessary to provide force not only to rotate the door but additionally to separate the gasket from the main body.

In conventional refrigerators, a technology of connecting a motor to a hinge unit of a door is used. In this case, since there is a significant difference between the force required to separate the gasket and the force required to rotate the door, an excessively large actuator is necessary, which is inefficient. In addition, since the refrigerator is required to have increased space in order to accommodate the large actuator, it is difficult to provide the increased space without compromising the size or thermal insulation performance of a conventional refrigerator.

Furthermore, since a drive unit and an opening and closing unit are connected to each other even when the door is manually opened, there are problems in that a lot of power is required for a user to manually open the door and in that the drive unit may be broken while a user opens the door.

In addition, when an opening or closing command is input through an input unit while a user is holding objects with both his/her hands under the condition that the door is opened, it is impossible to close the door.

Furthermore, when there is an extraneous object or a user blocking the door while the door is automatically opened or closed, the motor for driving the door may be overloaded, and the user may be injured.

DISCLOSURE

Technical Problem

Therefore, the present invention has been made in view of the above problems, and it is an object of the present invention to provide a door opening and closing device for a refrigerator, which is capable of opening and closing a door of a refrigerator using a low-powered compact motor.

Another object of the present invention is to provide a door opening and closing device for a refrigerator, which is constructed to recognize the opening or closing operation of a door when a user begins to manually open or close the door, thus enabling the door to be completely opened or closed in an automatic manner.

Technical Solution

In accordance with an aspect of the present invention, the above and other objects can be accomplished by the provision of a door opening and closing device for a refrigerator, including a door coupled by means of a hinge unit to a main body including a storage compartment defined therein, an opening and closing unit including a drive unit for generating rotational force by means of a motor and a door rotating mechanism for rotating the door using the rotational force of the drive unit so as to open or close the door, a back electromotive force measuring device for measuring a back electromotive force value generated in the motor, a power circuit connected to a power supply to supply power to the motor, a back electromotive force circuit for transmitting the back electromotive force of the motor to the back electromotive force measuring device, a control switch for selectively connecting the motor to one of the back electromotive force circuit and the power circuit, and a control unit for controlling the control switch to be connected to the power circuit when the motor is activated, and controlling the control switch to be connected to the back electromotive force circuit and controlling the motor to open or close the door when the motor is deactivated, wherein the control unit controls the door to be rotated in a closing direction when a predetermined back electromotive force is input to the back electromotive force measuring device in the state in which the motor is deactivated.

In accordance with another aspect of the present invention, there is provided a door opening and closing device for a refrigerator, including a door coupled by means of a hinge unit to a main body including a storage compartment defined therein, an opening and closing unit for opening or closing the door with respect to a main body using rotational force of a motor, a back electromotive force measuring device for measuring a back electromotive force value generated in the motor, a door switch for detecting that the door is opened to a predetermined angle with respect to the main body, and a control unit for controlling the motor to open or close the door, wherein the control unit controls the door to be opened when it is detected by the door switch that the door is opened, and controls the door to be closed when a back electromotive force is detected by the back electromotive force measuring device.

The door opening and closing device may further include a door switch for detecting that the door is opened to a predetermined angle with respect to the main body, wherein the control unit controls the door to be rotated in an opening direction when the opening of the door is detected by the door switch.

The back electromotive force circuit may include a back electromotive force distributor for distributing a back electromotive force input from the motor.

The door opening and closing device may further include a memory unit for storing the operation mode of the door, wherein the control unit controls a drive unit in accordance with the operation mode stored in the memory unit.

The door opening and closing device may further include an input unit through which a user's opening or closing command is input, wherein the control unit controls the door to be opened or closed in response to the opening or closing command input through the input unit.

The open and closing unit may include a synchronizer for connecting the door rotating mechanism to the drive unit when the door is opened with respect to the main body to the predetermined angle.

The door rotating mechanism may be disconnected from the drive unit when the door is closed.

The door rotating mechanism may include a rotational pinion gear for transmitting the rotational force of the drive unit, and a rotational rack, which engages with the rotational pinion gear and moves linearly, wherein the rotational rack engages with a hinge gear formed on the outer surface of the hinge unit.

The synchronizer may include a lever body, rotatably coupled to the door or the main body, and an elastic member for supplying an elastic restoring force to the lever body, wherein the lever body is rotated by the elastic restoring force of the elastic member to cause the rotational rack to engage with the rotational pinion gear.

The rotational rack and the hinge gear may be maintained spaced apart from each other when the lever body is rotated by the elastic restoring force of the elastic member.

The door opening and closing device may further include a gasket disposed between the door and the main body to provide a hermetic seal therebetween and a gasket separation mechanism for pushing the main body using the rotational force of the drive unit to separate the gasket from the main body or the door, wherein the gasket separation mechanism is spaced apart from a hinge shaft of the hinge unit by a predetermined distance.

The gasket separation mechanism may include a push pinion gear, for transmitting the rotational force of the drive unit, and a push rack that engages with the push pinion gear to increase the distance between the main body and the door.

The door opening and closing device may further include a rack guide provided on the front surface of the main body so as to guide the push rack, wherein the rack guide progressively protrudes in the direction of the door as it moves away from the hinge unit.

The door rotating mechanism may be operated after the gasket has been separated from the main body or the door by the gasket separation mechanism during the operation of opening the door.

The synchronizer may connect the door rotating mechanism to the drive unit after the gasket has been separated from the main body or the door by the gasket separation mechanism during operation of opening the door.

The door opening and closing device may further include a load detector for detecting a load of the motor, wherein the control unit halts operation of the motor when a load value input through the load detector during operation of the motor exceeds a predetermined load value.

In accordance with a further aspect of the present invention, there is provided a method of controlling an opening and closing device for a refrigerator, including detecting that the operation of the motor is halted, disconnecting the motor from a power circuit and connecting the motor to a back electromotive force circuit when the operation of the motor is halted, disconnecting the motor from the back electromotive force circuit and connecting the motor to the power circuit when a predetermined back electromotive force value is detected, and activating the motor to rotate the door in a closing direction.

The method may further include the halting operation of the motor when a load value exceeding a predetermined load value is detected during the operation of the motor.

The method may further include activating the motor to rotate the door in an opening direction when the door is opened to a predetermined angle by an external force.

Advantageous Effects

The door opening and closing device for a refrigerator according to the present invention provides at least one of the following effects.

According to an embodiment of the present invention, when a user begins to manually open a door, the door opening and closing device recognizes the manual opening of the door and then completely opens or closes the door in an automatic manner.

Furthermore, when the operation of the motor is halted, the door opening and closing device connects the back electromotive force circuit to the motor so as to accurately and rapidly measure back electromotive force generated from the motor.

In addition, when the operation of the door is interrupted, the door opening and closing device halts the operation of the door so as to protect a user and the motor.

Since the door opening and closing device according to an embodiment incorporates therein a gasket separation mechanism for separating a gasket and a door rotating mechanism for rotating a door after separation of the gasket, it is possible to separate the gasket from the main body using a small force and to open or close the door at a high speed.

Furthermore, since the gasket separation mechanism and the door rotating mechanism are operated by a single source of driving force, the space defined between the door and the main body is reduced.

In addition, since the force applied to the door and the rotational speed of the door vary in accordance with the operating range of the door thanks to the adoption of a rack guide and a hinge gear and a rotational rack having a varying radius, it is possible to realize a door which is operated smoothly and naturally and which exhibits high efficiency.

Furthermore, it is possible to incorporate even a low-powered compact motor into a drive unit of the door opening and closing device.

In addition, when the door is manually opened, the door opening and closing device rotates the door so as to decrease the force required for a user to open the door.

Furthermore, when the door is manually opened by a user, the drive unit is disconnected from the opening and closing unit so as to allow the door to be easily opened by a user and to protect the drive unit.

In addition, since the door opening and closing device adopts the synchronizer having a simplified structure, the drive unit is easily connected to the door rotating mechanism upon opening of the door.

DESCRIPTION OF DRAWINGS

The above and other objects, features and other advantages of the present invention will be more clearly understood from the following detailed description taken in conjunction with the accompanying drawings, in which:

FIG. 1 is a perspective view showing a refrigerator according to a first embodiment of the present invention;

FIG. 2 is a front view showing the refrigerator shown in FIG. 1 in which the doors of the refrigerator are open;

FIG. 3 is a perspective view showing the door opening and closing device for a refrigerator according to a first embodiment of the present invention;

FIG. 4 is an exploded perspective view showing the door opening and closing device for a refrigerator according to the first embodiment of the present invention;

FIG. 5 is a perspective view showing an opening and closing unit according to the first embodiment of the present invention;

FIG. 6 is a plan view showing the opening and closing unit according to the first embodiment of the present invention;

FIG. 7 is a plan view partially showing the opening and closing unit according to the first embodiment of the present invention;

FIG. 8 is a control block diagram of the door opening and closing device for a refrigerator according to the first embodiment of the present invention;

FIG. 9 is a schematic circuit diagram of the motor and the control unit when the motor is activated;

FIG. 10 is a schematic circuit diagram of the motor and the control unit when the motor is deactivated;

FIGS. 11 to 13 are plan views showing the closing operation of the door opening and closing device for a refrigerator according to the first embodiment of the present invention in the semi-auto mode;

FIGS. 14 to 16 are plan views showing the opening operation of the door opening and closing device for a refrigerator according to the first embodiment of the present invention in the semi-auto mode;

FIGS. 17 to 19 are plan views showing the operation of the door opening and closing device for a refrigerator according to the first embodiment of the present invention in the manual mode;

FIGS. 20 to 22 are plan views showing the operation of the door opening and closing device for a refrigerator according to the first embodiment of the present invention in the auto mode; and FIG. 23 is a flowchart of the method of controlling the door opening and closing device for a refrigerator according to the first embodiment of the present invention.

BEST MODE

The advantages, features and methods for achieving those in the embodiments may become apparent upon referring to the embodiments, described later in detail together with attached drawings. However, the embodiments are not limited to the embodiments disclosed hereinafter, but may be embodied in different modes. The embodiments are provided for completeness of disclosure and informing the scope to persons skilled in this field of art. The same reference numbers may refer to the same elements throughout the specification.

Unless otherwise defined, all terms (including technical and scientific terms) used in this specification have the same meaning as commonly understood by a person having ordinary skill in the art to which the present invention pertains. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness or size of each element is exaggerated, omitted, or schematically illustrated for convenience of description and clarity. In addition, the size or area of each element does not necessarily reflect the actual size thereof.

In addition, angles or directions used to describe the structures of embodiments of the present invention are based on those shown in the drawings. Unless there is, in the description of the structures of embodiments of the present invention disclosed in this specification, no definition of the reference points and the positional relationships in the respective drawings, the associated drawings may be referred to.

Hereinafter, refrigerators according to embodiments of the present invention will be described with reference to the accompanying drawings.

FIG. 1 is a perspective view showing a refrigerator according to a first embodiment of the present invention, and FIG. 2 is a front view showing the refrigerator shown in FIG. 1 in which the doors of the refrigerator are open.

As shown in FIGS. 1 and 2, the refrigerator according to the embodiment of the present invention includes a main body 2 having storage compartments F and R defined therein, a cooling device 40 for cooling the storage compartments F and R, and doors 4 and 6 for opening or closing the storage compartments F and R, respectively.

The cooling device 40 exchanges heat with the outside so as to cool the storage compartments F and R. The cooling device 40 may be constituted by a refrigeration cycle device including a compressor, a condenser, an expansion unit, and an evaporator. Alternatively, the cooling device 40 may be constituted by a thermoelectric element that includes first and second metals, which are different from each other and spaced apart from each other such that one of the first and second metals absorbs heat and the other of the first and second metals radiates heat by applying current to the first and second metals. Hereinafter, the cooling device 40 will be described as being constituted by the refrigeration cycle device.

The cooling device 40 circulates a refrigerant in order of the compressor->the condenser->the expansion device->the evaporator->the compressor to cool the storage compartments F and R.

The evaporator of the cooling device 40 may be disposed in contact with the outer walls of the storage compartments F and R so as to directly cool the storage compartments F and R. Alternatively, the cooling device 40 may further include a cool air circulation fan to circulate air in the storage compartments F and R through the evaporator and the storage compartments F and R such that the air in the storage compartments F and R can cool the storage compartments F and R while circulating through the storage compartments F and R and the evaporator.

The storage compartments F and R of the main body 2 may be provided therein with shelves 8 and 10, on which objects to be stored, such as foodstuffs and side dishes, are placed.

In addition, the storage compartments F and R of the main body 2 may be provided therein with a vegetable container for storing vegetables and fruits.

The storage compartments F and R may be defined in the main body 2 by storage compartment frames 21. The storage compartment frames 21 provide areas with which the doors 4 and 6 come into contact, and define the walls of the storage compartments F and R.

The storage compartment frames 21 are formed to correspond to the peripheries of rear surfaces of the doors 4 and 6 so as to closely contact the rear surfaces.

Specifically, the storage compartment frames 21 have respective inner surfaces that are inwardly stepped and come into close contact with the doors 4 and 6.

The doors 4 and 6 are installed at the main body 2 so as to swing left and right or up and down. A door basket 5 for storing drinks such as spring water, milk, juice, and alcoholic beverages or frozen foods such as ice cream is disposed at the side of the doors 4 and 6 that faces the storage compartments F and R (i.e. the rear of the doors) when the doors 4 and 6 are closed.

The door basket 5 is preferably composed of a plurality of door baskets 5 which are mounted at the doors 4 and 6 so as to be vertically spaced apart from each other.

The storage compartments F and R may include a freezing compartment F and a refrigerating compartment R. The doors 4 and 6 may include a freezing compartment door 4 for opening or closing the freezing compartment F and a refrigerating compartment door 6 for opening or closing the refrigerating compartment R. The shelves 8 and 10 may include a freezing compartment shelf 8 disposed in the freezing compartment F and a refrigerating compartment shelf 10 disposed in the refrigerating compartment R. The door basket 5 may be mounted in the freezing compartment F to store objects to be frozen, such as ice cream, or in the refrigerating compartment R to store objects to be refrigerated, such as milk, juice, and alcoholic beverages.

The doors 4 and 6 are hinged to the main body 2 by means of hinge units 23 to open or close the storage compartments F and R, respectively.

The doors 4 and 6 may have any size and shape so long as they shield the storage compartments F and R. By way of example, the storage compartment frames 21 constituting the walls of the storage compartments F and R may be configured to have a rectangular shape such that the storage compartment frames 21 closely contact the peripheries of the doors 4 and 6.

The door basket 5 for supporting storage objects may be disposed at the center of the rear surface of each of the doors 4 and 6. A locking unit (not shown) may be further provided to couple each of the doors 4 and 6 to the main body 2.

Furthermore, door switches 22 may be provided to detect the opening of the doors 4 and 6 and the angles at which the doors 4 and 6 are open.

In addition, there may be gaskets 7 disposed between the doors 4 and 6 and the main body 2 to provide seals therebetween.

The gaskets 7 are positioned between the respective doors 4 and 6 and the main body 2 to seal the storage compartments F and R.

In order to prevent outside air from entering the storage compartments F and R, each of the gaskets 7 may constitute a closed loop surrounding at least one of the storage compartments F and R.

Specifically, the gaskets 7 may be disposed between the storage compartment frames 21 constituting the walls of the storage compartments F and R and the rear surfaces of the doors 4 and 6, which contact the storage compartment frames 21. Furthermore, the gaskets 7 may be attached to the storage compartment frames 21 or the rear surfaces of the doors 4 and 6.

More specifically, the gaskets 7 may be attached to the peripheries of the rear surfaces of the doors 4 and 6. Accordingly, the gaskets 7 may closely contact the rear surfaces of the doors 4 and 6 when the doors 4 and 6 are closed, and thus the storage compartments may be maintained in the sealed state by means of the gaskets 7.

Generally, since the gaskets 7 are magnetic, the adherence between the doors 4 and 6 and the main body 2 is improved.

In order to automatically open the door 4 or 6, it is necessary to provide force not only to rotate the door 4 or 6 but also to separate the gasket 7 from the main body 2. Hereinafter, the gaskets 7 will be described as being coupled to the rear surfaces of the doors 4 and 6.

In conventional refrigerators, a technology for coupling a motor to a hinge shaft of each of the doors 4 and 6 has been used. In this case, since there is a great difference between the force required to separate the gasket 7 and the force required to rotate each of the doors 4 and 6, it is required to provide an excessively large actuator and a large space for accommodating the large actuator. Accordingly, it is difficult to incorporate the actuator into existing refrigerators without compromising the volumes or thermal insulation efficiency of the existing refrigerators.

Furthermore, in a conventional door 4 or 6, which is controlled by the driving force of a motor, since the motor does not operate when the door is manually opened by a user, there is a problem whereby the user meets a resisting force in the action of opening the door.

In addition, in a conventional door 4 or 6, when a door opening or closing command is input through an input unit while a user holds objects with both his/her hands under the condition that the door 4 or 6 is open, there is a problem whereby the door 4 or 6 cannot be closed.

In order to solve the above problems, an opening and closing device for a refrigerator door according to embodiments of the present invention is devised.

A door opening and closing device for a refrigerator according to a first embodiment of the present invention includes a door 4 or 6 coupled by means of a hinge unit 23 to a main body 2 having a storage compartment defined therein, an opening and closing unit 30 for opening or closing the door 4 or 6 with respect to the main body 2, a back electromotive force measuring device 410, a power circuit 401, a back electromotive force circuit 402, a control switch 430 and a control unit 370.

A door opening and closing device for a refrigerator according to another embodiment of the present invention includes a door 4 or 6 coupled by means of a hinge unit 23 to a main body 2 having a storage compartment defined therein, an opening and closing unit 30 for opening or closing the door 4 or 6 with respect to the main body 2, a back electromotive force measuring device 410, a door switch 22 and a control unit 370.

A gasket 7 may be disposed between the main body 2 and the door 4 or 6 so as to provide a hermetic seal therebetween.

The main body 2, the door 4 or 6, and the gasket 7 have already been described above.

Hereinafter, the construction of the opening and closing unit 30 will be described in detail.

FIG. 3 is a perspective view showing the door opening and closing device for a refrigerator according to a first embodiment of the present invention. FIG. 4 is an exploded perspective view showing the door opening and closing device for a refrigerator according to the first embodiment of the present invention. FIG. 5 is a perspective view showing an opening and closing unit according to the first embodiment of the present invention. FIG. 6 is a plan view showing the opening and closing unit according to the first embodiment of the present invention. FIG. 7 is a plan view partially showing the opening and closing unit according to the first embodiment of the present invention.

Referring to FIGS. 3 to 7, the opening and closing unit 30 is constructed to open or close the door 4 or 6 with respect to the main body 2.

By way of example, when the door 4 or 6 is manually opened to a predetermined angle by a user, the opening and closing unit 30 rotates the door 4 or 6 using the driving force and thus completely open the door 4 or 6. When the door 4 or 6 is manually rotated in the closing direction, the opening and closing unit 30 rotates the door 4 or 6 using the driving force and completely closes the door 4 or 6. This operation mode is referred to as a semi-auto mode.

In another example, when the door 4 or 6 is manually opened to a predetermined angle by a user, the opening and closing unit 30 disconnects the connection between the hinge unit 23 and the opening and closing unit 30 so as to enable a user to easily open the door to the full extent. This an operation mode is referred to as a manual mode.

In a further example, in order to separate the gasket 7 from the main body 2 in the initial stage of the action of opening the door 4 or 6, the opening and closing unit 30 spaces the door 4 or 6 apart from the main body 2 using a relatively strong force. Once the gasket 7 is separated from the main body 2, the opening and closing unit 30 rotates the door 4 or 6 using a small force. Furthermore, the opening and closing unit 30 rotates and thus closes the door 4 or 6. This operation mode is referred to as an auto mode.

The opening and closing unit 30 may be coupled to the door 4 or 6 so as to be disposed in the space defined between the door 4 or 6 and the main body 2. Specifically, the opening and closing unit 30 may be disposed in a space in the upper end or the lower end of the door 4 or 6.

The opening and closing unit 30 may be coupled to the door 4 or 6 by means of a casing. The casing provides a space which enables the opening and closing unit 30 to be secured to the door 4 or 6 and to which respective components of the opening and closing unit 30 are secured.

For example, the casing may include a first casing 310, defining the appearance thereof and having a space in which the opening and closing unit 30 is disposed, and a second casing 313, which is received in the first casing 310 and to which the opening and closing unit 30 is secured.

The opening and closing unit 30 may be disposed outside the area (the inner area of the closed loop) defined by the gasket 7.

The opening and closing unit 30 may be variously constructed so as to open or close the door 4 or 6 using the driving force of the motor 321.

*110 By way of example, the opening and closing unit 30 may include a drive unit 320, a door rotating mechanism 340 and a synchronizer 350.

In another example, the opening and closing unit 30 may include the drive unit 320, the gasket separation mechanism 330 and the door rotating mechanism 340.

The drive unit 320 generates driving force (rotational force) and supplies the driving force to the gasket separation mechanism 330 and the door rotating mechanism 340.

For example, the drive unit 320 may include a motor 321 for generating rotational force and a motor gear 322 for transmitting the rotational force.

The drive, unit 320 may be directly or indirectly connected to the gasket separation mechanism 330 and the door rotating mechanism 340.

The driving unit 320 may be connected to the gasket separation mechanism 330 and the door rotating mechanism 340 via a plurality of connecting gears.

Specifically, the motor gear 322 of the drive unit 320 engages with a first connecting gear 325$a$, which in turn engages with a second connecting gear 325$b$, which in turn engages with a third connecting gear 325$c$.

The third connecting gear 325$c$ may engage with a push pinion gear 331 of a gasket separation mechanism 330, which will be described later. However, the embodiment of the present invention is not limited thereto, and the linkage may be variously set in consideration of the force and speed that are transmitted from the single motor 321 to the gasket separation mechanism 330 and the door rotating mechanism 340.

The door rotating mechanism 340 rotates the door 4 or 6 in the opening or closing direction using the rotational force transmitted from the drive unit 320.

In the action of opening the door in the auto mode, the door rotating mechanism 340 may be activated after the gasket 7 is separated from the main body 2 or the door 4 or 6 by means of the gasket separation mechanism 330.

In the semi-auto mode, the door rotating mechanism 340 may be operated in conjunction with the synchronizer 350 by the synchronizer 350.

In the manual mode, the door rotating mechanism 340 may be disconnected from the drive unit 320, and may not be operated.

When the door 4 or 6 is in the state of being closed, the door rotating mechanism 340 may be disconnected from the drive unit 320.

The door rotating mechanism 340 rotates the door 4 or 6, which does not require a strong force to be rotated after the separation of the gasket 7 from the main body 2 by the gasket separation mechanism 330. Consequently, the door rotating mechanism 340 is capable of rotating the door 4 or 6 using only a small force.

There are various ways to cause the door rotating mechanism 340 to be actuated after the gasket 7 is separated from the main body 2. For example, the gasket separation mechanism 330 and the door rotating mechanism 340 may be controlled independently using a physical synchronizer 350 or a plurality of drive sources.

For example, the door rotating mechanism 340 includes a rotational pinion gear 341 for transmitting the rotational force of the drive unit 320 and a rotational rack 343 that engages with the rotational pinion gear 341 and moves linearly.

The rotational pinion gear 341 serves to transmit the rotational force of the drive unit 320 to the rotational rack 343. The rotational pinion gear 341 may be directly or indirectly connected to the drive unit 320.

Specifically, the rotational pinion gear engages with the push pinion gear 331 so as to receive the rotational force of the drive unit 320.

More specifically, the rotational pinion gear 341 includes two axial sub gears, one of which engages with the push pinion gear 331 and the other of which engages with the rotational rack 343.

The rotational rack 343 is moved linearly by the rotational force transmitted from the rotational pinion gear 341. Specifically, the rotational rack 343 may move linearly in the width direction of the door 4 or 6.

The rotational rack 343 engages with a hinge gear 233 formed on the outer surface of the hinge unit 23.

The rotational rack 343 moves in the direction of the hinge unit 233 during the action of opening the door 4 or 6, and moves in the opposite direction during the action of closing the door 4 or 6.

For example, the rotational rack 343 may include a body 345, an engaging gear 347 formed at one end of the body 345 and engaging with the rotational pinion gear 341, and an acceleration gear 346 formed at the other end of the body 345 and engaging with the hinge gear 233 to change the rotational speed of the door 4 or 6.

*133 The engaging gear 347 is formed on the body 345 in the longitudinal direction of the body 345. Specifically, the engaging gear 347 is disposed to be spaced apart from the rotational pinion gear 341 in the initial stage of the action of opening the door 4 or 6. Subsequently, the engaging gear 347 may be engaged with the rotational pinion gear 341 by an external force.

More specifically, the rotational pinion gear 341 may be positioned at the center of the body 345, and the engaging gear 347 may be formed in a section ranging from one end of the body 345 almost to the center of the body 345.

The acceleration gear 346 engages with the hinge gear 233 and rotates the door 4 or 6 by the linear moving force of the rotational rack 343. Since the hinge gear 233 is in a stationary state, the door 4 or 6, to which the rotational rack 343 is secured, moves relative thereto (i.e. relative to the hinge gear 233) when the rotational rack 343 moves.

The acceleration gear 346 may be configured to change the rotational speed of the door 4 or 6.

For example, the acceleration gear 346 may be configured to have a shape having a varying radius so as to engage with the hinge gear 233.

Specifically, the acceleration gear 346 may include a first gear section 346a and a second gear section 346b.

The first gear section 346a has teeth that are inclined with respect to the moving direction of the rotational rack 343

The second gear section 346b has teeth that are parallel to the moving direction of the rotational rack 343.

The first gear section 346a serves to transmit a strong force in the initial stage of the action of rotating the door 4 or 6.

When the door 4 or 6 is closed (hereinafter, referred to as an initial state), the rotational pinion gear 341 and the drive unit 320 are spaced apart from each other, and the hinge gear 233 and the rotational rack 343 are also spaced apart from each other. In other words, the rotational pinion gear 341 and the engaging gear 347 are disconnected from each other, and the acceleration gear 346 and the hinge gear 233 are also disconnected frOm each other.

When the synchronizer 350 is actuated by the opening of the door 4 or 6, the rotational pinion gear 341 engages with the drive unit 320 while the hinge gear 233 and the rotational rack 343 are in the state of being spaced apart from each other.

Under the condition that the rotational pinion gear 341 engages with the drive unit 320, the pinion gear 341 is rotated by the drive unit 320 with the result that the hinge gear 233 engages with the rotational rack 343.

Accordingly, the length of the rotational rack 343 and the positions of the engaging gear 347 and the acceleration gear 346 may be set such that under the condition that the door 4 or 6 is in the state of being closed, the rotation pinion gear 341 is spaced apart from the drive unit 320 while the hinge gear 233 and the rotational rack 343 are spaced apart from each other.

The hinge unit 23 may include a stationary hinge part 231 secured to the body 2 and a rotatable hinge part 232 secured to the door 4 or 6 and rotatably coupled to the stationary hinge part 231.

The hinge unit 23 is positioned at one end of the door 4 or 6 in the width direction of the door.

Specifically, the hinge gear 233 is formed on the outer surface of the stationary hinge part 231.

When the radius of the hinge gear 233 increases, only a small force is required to rotate the door 4 or 6, but the rotational speed of the door 4 or 6 is low. On the other hand, when the radius of the hinge gear 233 decreases, a strong force is required to rotate the door 4 or 6 but the rotational speed of the door 4 or 6 is high.

Although a strong force is required to rotate the door 4 or 6 in the initial stage of the action of rotating the door 4 or 6, only a small force is required to rotate the door 4 or 6 after the rotational speed is increased above a predetermined speed.

Accordingly, the hinge gear 233 may be configured to have a shape capable of changing the rotational speed of the door 4 or 6 and the force acting on the door 4 or 6.

Specifically, the radius of the hinge gear 233 may decrease in the direction in which the door 4 or 6 opens.

More specifically, the radius of the hinge gear 233 may decrease from a first radius R1 to a second radius R2 as it moves in the direction in which the door 4 or 6 opens.

The section of the hinge gear 233 having the larger radius engages with the first gear section 346a of the acceleration gear 346, and the section of the hinge gear 233 having the smaller radius engages with the second gear section 346b of the acceleration gear 346.

In the initial stage of the action of opening the door 4 or 6, the acceleration gear 346 of the rotational rack 343 engages with the portion of the hinge gear 233 that has the largest radius. Specifically, in the initial stage of the action of opening the door 4 or 6, the end point of the first gear section 346a engages with the portion of the hinge gear 233 that has the largest radius.

For the smooth engagement between the acceleration gear 346 and the hinge gear 233, the first gear section 346a may, of course, be curved.

When the door 4 or 6 is opened to a predetermined angle with respect to the main body 2, the synchronizer 350 causes the door rotating mechanism to be connected to the drive unit 320. The predetermined angle by which the door 4 or 6 is opened refers to the rotational angle to which the door 4 or 6 is rotated about the hinge shaft in front of the main body 2. The predetermined angle may be set to be within a range of 2 to 4 degrees.

In the operation of opening the door 4 or 6, the door rotating mechanism 340 is configured to be actuated after the gasket 7 is separated from the main body 2 or the door 4 or 6 by means of the gasket separation mechanism 330. In other words, in the operation of opening the door 4 or 6, the synchronizer 350 causes the door rotating mechanism 340 to operate after the operation of the gasket separation mechanism 330, with a time interval therebetween.

When the door 4 or 6 is opened with respect to the main body 2 to the predetermined angle, only the door rotating mechanism 340 may operate, or both the gasket separation mechanism 330 and the door rotating mechanism 340 may operate together.

For example, the synchronizer 350 is rotated depending on the distance between the door 4 or 6 and the main body 2, and allows the door rotating mechanism 340 to be connected to the drive unit 320 by elastic restoring force.

Specifically, the synchronizer 350 is pressed by the door 4 or 6 and the main body 2 while accumulating elastic restoring force in the initial state, in which the door 4 or 6 comes close to the main body 2, and causes the door rotating mechanism 340 to be connected to the drive unit 320 by the elastic restoring force as the door 4 or 6 moves away from the main body 2.

More specifically, the synchronizer 350 may include a lever body 351 and an elastic member 354.

The elastic member 354 accumulates an elastic force and exerts the elastic restoring force when the lever body 351 is rotated.

By way of example, the elastic member 354 may be embodied as a torsion spring. Specifically, one of the two arms of the torsion spring may be secured to the casing and the other of the two arms of the torsion spring may be secured to the lever body 351.

The lever body 351 may be rotatably supported by the door 4 or 6 or the main body 2. The lever body 351 is preferably secured to the casing in a rotatable manner by means of a support pin 353.

Specifically, the lever body 351 includes two arms arranged about the support pin 353.

One of the two arms of the lever body 351 is caught by a boss 348 formed on the rotatable rack 343 and the other of the two arms is pushed by the main body 2.

The arm of the lever body 351 that contacts the main body 2 may be referred to as a first arm 351*a*, and the other arm of the lever body 351, which is caught by the boss 348 formed on the rotational rack 343, may be referred to as a second arm 351*b*.

When the distance between the rear surface of the door 4 or 6 and the front surface of the main body 2 becomes smaller than a predetermined distance, the first arm 351*a* is pushed by the main body 2 and is thus rotated in one direction.

In the initial state, in which there is no elastic restoring force, the first arm 351*a* may be inclined in one direction with respect to the line perpendicular to the front surface of the main body 2. Consequently, the first arm 351*a* may be easily pushed and rotated by the main body 2.

Specifically, the synchronizer 350 is rotated by the elastic restoring force so as to move the rotational rack 343 toward the hinge unit 23, thus causing the rotational rack 343 to engage with the rotational pinion gear 341. The rotational pinion gear 341 may engage with the engaging gear 347 of the rotational rack 343.

At this point, the rotation of the rotational pinion gear 341 causes the rotational rack 343 to engage with the hinge gear 233.

More specifically, as the door 4 or 6 moves away from the main body 2, the lever body 351 is rotated by the elastic restoring force, and, as such, the second arm 351*b* moves the boss 348 formed on the rotational rack 343 toward the hinge unit 23. Even though the lever body 351 is rotated by the elastic restoring force, the rotational rack 343 is maintained spaced apart from the hinge gear 233.

The synchronizer 350 is configured to actuate the door rotating mechanism 340 after the gasket 7 is separated from the main body 2 or the door 4 or 6 by means of the gasket separation mechanism 330. In other words, the synchronizer 350 is configured to actuate the door rotating mechanism 340 after a predetermined period of time has elapsed since the operation of the gasket separation mechanism 330.

The synchronizer 350 may have various configurations which enable the door rotating mechanism 340 to be operated after the operation of the gasket separation mechanism 330.

For example, the synchronizer 350 may be rotated by the push rack 333 so as to cause the rotational rack 343 to engage with the rotational pinion gear 341, as shown in FIG. 7.

Specifically, the synchronizer 350 may be rotated by the push rack 333 so as to move the rotational rack 342 in the direction of the hinge unit 23, to thus cause the rotational rack 342 to engage with the rotational pinion gear 341.

More specifically, since the first arm 351*a* of the lever body 351 is caught by the boss 335 formed on the push rack 333, the first arm 351*a* may be rotated by the linear movement of the push rack 333.

The gasket separation mechanism 330 pushes the main body 2 using the rotational force transmitted from the drive unit 320 so as to separate the gasket 7 from the main body 2 or the door 4 or 6.

In particular, the gasket separation mechanism 330 provides a strong force in order to separate the gasket 7 from the door 4 or 6 or the main body 2 in the initial stage of the operation of opening the door 4 or 6. Furthermore, the gasket separation mechanism 330 provides a strong force in the initial stage of the operation of opening the door 4 or 6 such that the door rotating mechanism 340 can rotate the door 4 or 6 using a small force.

The gasket separation mechanism 330 may be connected to the drive unit 320 so as to receive a strong force from the drive unit 320.

For example, the gasket separation mechanism 330 may include the push pinion gear 331 and the push rack 333, which engages with the push pinion gear 331 so as to increase the distance between the main body 2 and the door 4 or 6.

In other words, the gasket separation mechanism 330 spaces the door 4 or 6 apart from the main body 2 by converting the rotational force of the drive unit 320 into linear movement.

The push pinion gear 331 serves to transmit the rotational force of the drive unit 320 to the push rack 333.

Specifically, the push pinion gear 331 receives the rotational force of the drive unit 320 by engaging with the third connecting gear 325*c*.

More specifically, the push pinion gear 331 may include two coaxial sub gears so as to transmit the rotational force to the rotational pinion gear 341 of the door rotating mechanism 340.

The push rack 333 is moved linearly by the rotational force of the push pinion gear 331.

The rotational force of the push pinion gear 331 that moves the push rack 333 linearly is strong and has a low rotational speed.

The push rack 333 is moved linearly toward the front surface of the main body 2 from the rear surface of the door 4 or 6. Accordingly, the push rack 333 pushes the main body 2 so as to increase the distance between the main body 2 and the door 4 or 6 and separate the gasket 7 from the main body 2.

The front surface of the main body 2 is configured to have a flat face so as to reliably contact the door 4 or 6 and/or the gasket 7. When the door 4 or 6 is spaced apart from the main body 2 by means of the push rack 333, the door 4 or 6 is rotated about the hinge shaft of the hinge unit 23. When the door 4 or 6 is rotated while the push rack 333 moves toward the main body 2, the contact point between the push rack 333 and the main body 2 moves away from the hinge unit 23. Hence, there is a problem in that the rotational speed of the door 4 or 6 can be maintained constant only by increasing the length of the push rack 333.

FIG. 8 is a control block diagram of the door opening and closing device for a refrigerator according to the first embodiment of the present invention. FIG. 9 is a schematic circuit diagram of the motor and the control unit when the motor is activated. FIG. 10 is a schematic circuit diagram of the motor and the control unit when the motor is deactivated.

Referring to FIG. 8, the door opening and closing device for a refrigerator according to the first embodiment of the present invention may further include an input unit, a memory unit 380, a door switch 22 and a load detector 420.

The door switch 22 detects that the door 4 or 6 is opened to a predetermined angle with respect to the main body 2, and sends the result of the detection to the control unit 370.

The door switch 22 may be constructed by various known technologies capable of detecting the opening of the door 4 or 6.

The input unit 360 receives signals for the operation of opening and closing the door 4 or 6. An operation mode is input into the input unit 360.

The input unit 360 generates input data, input by a user so as to control the operation of the door 4 or 6. The input data received in the input unit 360 is sent to the control unit 370.

The input unit 360 may recognize a user's voice and may convert an opening or closing command corresponding to the user's voice into an electronic signal (input data).

Furthermore, the input unit 360 may recognize a user's touch and may convert an opening or closing command corresponding to the user's touch into an electronic signal.

For example, the input unit 360 may be constituted by a key pad, a dome switch 430, a touch pad (electrostatic/pressure-sensitive), a jog wheel, a jog switch 430, a slide switch 430, a finger mouse, or the like.

The memory unit 380 may store the operation mode of the door 4 or 6. The memory unit 380 may be a recording medium capable of storing data.

Referring to FIGS. 8 to 10, the back electromotive force measuring device 410 serves to measure the value of the back electromotive force generated from the motor 321 of the drive unit 320, and sends the value to the control unit 370.

Generally, a back electromotive force is generated when the motor 321 is forcibly rotated by an external force (for example, forced rotation of the door 4 or 6).

The control unit 370 is typically constituted by a printed circuit board on which a plurality of electronic components are mounted. Since capacitors are mounted on the printed circuit board, it is difficult to measure a back electromotive force.

Hence, according to this embodiment, the back electromotive force circuit 402 and the power circuit 401 are constructed separately.

The back electromotive force circuit 402 is electrically isolated from other electronic devices so as to prevent the measurement of back electromotive force from being interrupted by the other electronic devices (the control unit 370, the capacitor, and the like).

The back electromotive force circuit 402 serves to transmit the back electromotive force generated from the motor 321 to the back electromotive force measuring device 410.

For example, the back electromotive force circuit 402 may be constituted by a closed circuit for electrically connecting the motor 321 to the back electromotive force measuring device 410.

The back electromotive force circuit 402 may be electrically connected to the ground.

The back electromotive force circuit 402 may further be provided with a back electromotive force distributor 440 for distributing the back electromotive force input from the motor 321.

The back electromotive force distributor 440 serves to distribute the voltage input to the back electromotive force measuring device 410 in order to prevent excessive back electromotive force from being input from the back electromotive force measuring device 410.

For example, the back electromotive force distributor 440 may include two resistors R1 and R2 disposed on the back electromotive force circuit 402 and a branch line 403 branched from the back electromotive force circuit 402 between the two resistors R1 and R2 and electrically connected to the back electromotive force measuring device 410.

Since a voltage is proportional to a resistance value, it is possible to control the voltage input to the back electromotive force measuring device 410 by adjusting the voltage input to the back electromotive force measuring device 410.

The power circuit 401 is connected to a power supply so as to supply driving power to the motor 321.

For example, the power circuit 401 may be constituted by a closed circuit adapted to electrically connect the motor 321 to the power supply.

The power circuit may be electrically connected to the control unit 370.

The control switch 430 serves to selectively connect one of the back electromotive force circuit 402 and the power circuit 401 to the motor 321 in an electrical connection manner.

Specifically, the control switch 430 selectively connects the motor 321 to one of the back electromotive force circuit 402 and the power circuit 401 in response to a control signal from the control unit 370.

The load detector 420 detects the load of the motor 321 and sends the load value to the control unit 370.

For example, the load detector 420 may be a voltage or current measuring device. When a load is applied to the shaft of the motor 321, voltage decreases whereas current consumption increases. Accordingly, the load detector 420 may measure the load value of the motor 321 by measuring the voltage and current applied to the motor 321.

The control unit 370 may control the opening and closing unit 30 based on the input signal received from the back electromotive force measuring device 410 and the door switch 22.

Furthermore, the control unit 370 may control the control switch 430 depending on whether the motor 321 is activated or deactivated.

Specifically, the control unit 370 controls the control switch 430 to be connected to the power circuit 401 when the motor 321 is activated, and controls the control switch 430 to be connected to the back electromotive force circuit 402 when the motor 321 is deactivated.

More specifically, the control unit 370 controls the motor 321 to be electrically connected to the power circuit 401 via the control switch 430 when it is required to activate the motor 321, and controls the motor 321 to be electrically connected to the back electromotive force circuit 402 via the control switch 430 when the motor 321 is deactivated.

In this regard, the term "the case where it is required to activate the motor 321" means the case where it is necessary to rotate the door 4 or 6 by control of the motor 321 by the control unit 370.

The control unit 370 may control the opening and closing unit 30 by the command input through the input unit 360.

The control unit 370 may control the ON/OFF operation, rotational speed and rotational direction of the motor 321 of the drive unit 320.

The control unit 370 loads the operation mode stored in the memory unit 380, and performs control corresponding to the operation mode.

For example, when a door opening command is input through the input unit 360, the control unit 370 activates the motor 321 of the drive unit 320 to open the door 4 or 6. Meanwhile, when a door closing command is input through the input unit 360, the control unit 370 activates the motor 321 of the drive unit 320 to close the door 4 or 6. This operation corresponds to the auto mode. When the door opening command is input through the input unit 360, the control unit 370 may control the control switch 430 prior to the control of the drive unit 320 so as to electrically connect the motor 321 to the power circuit 401.

In another example, in the case where the operation mode stored in the memory unit 380 is the semi-auto mode, when the door 4 or 6 in a closed state is opened to a predetermined angle, the control unit 370 controls the door 4 or 6 to be rotated in the opening direction to thus be opened.

Specifically, in the case where the operation mode stored in the memory unit 380 is the semi-auto mode, the door 4 or 6 is opened to a predetermined angle by external force, the memory unit 380 controls the drive unit 320 to move the rotational rack 343 in the direction of the hinge unit 23, based on the signal input through the door switch 22. As a result, the door 4 or 6s is rotated and thus opened about the hinge shaft by means of the rotational rack 343.

Furthermore, in the case where the operation mode stored in the memory unit 380 is the semi-auto mode, when the door 4 or 6 is opened to a predetermined angle by an external force, the control unit 370 controls the drive unit 320 to move the push rack 333 toward the main body 2 and to move the rotational rack 343 toward the hinge unit 23, based on the signal input through the door switch 22.

At this time, the gasket 7 is separated from the main body 2, and the door 4 or 6 is rotated about the hinge shaft, and thus opened, by the rotational rack 343.

Furthermore, in the case where the operation mode stored in the memory unit 380 is the semi-auto mode, when a predetermined back electromotive force is input under the condition that the motor 321 is deactivated or the door 4 or 6 is opened, the control unit 370 controls the door 4 or 6 to be closed.

Specifically, when a value of back electromotive force exceeding the predetermined value is input from the back electromotive force measuring device 410 under the condition that the operation of the motor 321 is halted, the control unit 370 controls the drive unit 320 to move the rotational rack 343 in the opposite direction of the hinge unit 23. As a result, the door 4 or 6 is rotated and thus closed about the hinge shaft by the rotational rack 343.

When the load value input from the load detector 420 during the operation of the motor 321 exceeds the predetermined load value, the control unit 370 controls the motor 321 to be deactivated.

Specifically, in the auto mode or semi-auto mode, when the door 4 or 6 is caught by an extraneous object during its rotating operation, the control unit 370 may stop the operation of the door 4 or 6.

In a further example, in the case where the operation mode stored in the memory unit 380 is the manual mode, when the door 4 or 6 is opened to a predetermined angle by an external force, the control unit 370 controls the hinge gear 233 and the rotational rack 340 so as to keep them spaced apart from each other.

Specifically, when the operation mode stored in the memory unit 380 is the manual mode, the control unit 370 does not operate the drive unit 320. In other words, the control unit 370 controls the door rotating mechanism 340 so as not be connected to the hinge gear 233.

After a predetermined load has been applied to the motor 321 during the rotation of the door 4 or 6, the control unit 370 may determine that the door 4 or 6 is caught by an obstacle and may halt the rotation of the motor 321 of the drive unit 320.

Hereinafter, an operation of the door opening and closing device for a refrigerator according to the present invention will be described.

FIGS. 11 to 13 are plan views showing the closing operation of the door opening and closing device for a refrigerator according to the first embodiment of the present invention in the semi-auto mode.

Referring to FIG. 11, the door 4 or 6 is in the opened state (the operation of the motor 321 is halted), and the rotational rack 343 is in the state of engaging with the hinge gear 233.

When the door 4 or 6 is moved by an external force applied by a user or the like, the back electromotive force is generated from the motor 321 connected to the door 4 or 6.

Referring to FIGS. 12 and 13, when a back electromotive force exceeding the predetermined value is input from the back electromotive force measuring device 410, the control unit 370 controls the drive unit 320 to move the rotational rack 343 in the opposite direction of the hinge unit 23. Consequently, the door 4 or 6 is rotated and thus closed about the hinge shaft by the rotational rack 343. Furthermore, when the load value input from the load detector 420 during the operation of the motor 321 exceeds the predetermined load value, the control unit 370 halts the operation of the motor 321.

FIGS. 14 to 16 are plan views showing the opening operation of the door opening and closing device for a refrigerator according to the first embodiment of the present invention in the semi-auto mode.

Referring to FIG. 14, the closed state (the initial state) of the door 4 or 6 is shown. In the initial state of the door 4 or 6, the rotational rack 343 and the hinge gear 233 are spaced apart from each other, and the rotational rack 343 and the rotational pinion gear 341 are also spaced apart from each other.

When the door 4 or 6 is opened to a predetermined angle by an external force applied by a user or the like, the synchronizer 350 is rotated by the elastic restoring force, thus causing the rotational rack 343 to be moved toward the hinge unit 23 and to engage with the rotational pinion gear 341.

The synchronizer 350 may also be rotated by the movement of the push rack 333.

Referring to FIG. 14, when the door 4 or 6 is opened to the predetermined angle by an external force applied by a user or the like, the control unit 370 controls the drive unit 320 to move the rotational rack 343 toward the hinge unit 23 in response to the signal input through the door switch 22. As a result, the door 4 or 6 is rotated and thus opened about the hinge shaft.

When the door 4 or 6 is opened to the predetermined angle by an external force applied by a user or the like, the control unit 370 controls the drive unit 320 to move the push rack 333 toward the main body 2 and to move the rotational rack 343 toward the hinge unit 23, in response to the signal input through the door switch 22.

Referring to FIG. 16, the door 4 or 6 is rotated and thus opened by the movement of the rotational rack 343.

At this point, the rotational speed of the door 4 or 6 may be controlled by varying the shape of the hinge gear 233.

When the load value input from the load detector 420 during the operation of the motor 321 exceeds the predetermined load value, the control unit 370 halts the operation of the motor 321.

FIGS. 17 to 19 are plan views showing the operation of the door opening and closing device for a refrigerator according to the first embodiment of the present invention in the manual mode.

Referring to FIG. 17, the closed state (the initial state) of the door 4 or 6 is shown.

In the initial state of the door 4 or 6, the rotational rack 343 and the hinge gear 233 are spaced apart from each other, and the rotational rack 343 and the rotational pinion gear 341 are also spaced apart from each other.

When the door 4 or 6 is opened to the predetermined angle by an external force applied by a user or the like, the synchronizer 350 is rotated by the elastic restoring force, thus causing the rotational rack 343 to be moved toward the hinge unit 23 and to engage with the rotational pinion gear 341.

At this point, the rotational rack 343 and the hinge gear 233 are spaced apart from each other.

Subsequently, the control unit 370 controls the rotational rack 343 and the hinge gear 233 so as to keep them spaced apart from each other.

Specifically, the control unit 370 halts the operation of the drive unit 320, or controls the drive unit 320 to move the rotational rack 343 in the opposite direction of the hinge gear 233.

Referring to FIGS. 18 and 19, the door 4 or 6 is completely opened by an external force while the rotational rack 343 and the hinge gear 233 are in the state of being spaced apart from each other.

FIGS. 20 to 22 are plan views showing the operation of the door opening and closing device for a refrigerator according to the first embodiment of the present invention in the auto mode.

The opening operation of the door 4 or 6 is first described.

Referring to FIG. 20, the closed state of the door 4 or 6 is shown. In the initial stage of the operation of opening the door 4 or 6, the rotational rack 343 and the hinge gear 233 are in the state of being spaced apart from each other.

When the door opening command is input through the input unit 360, the control unit 370 outputs a control signal corresponding to the door opening command.

The drive unit 320 is operated in response to the control signal from the control unit 370. Specifically, the motor 321 of the drive unit 320 rotates in the direction in which the door 4 or 6 opens, and the rotational force of the motor 321 is transmitted to the push pinion gear 331 via the connecting gear 325c.

Referring to FIG. 21, the push pinion gear 331 is rotated so as to move the push rack 333 toward the rear surface from the front surface of the door 4 or 6.

At this time, the door 4 or 6 begins to rotate due to the repulsive force between the push rack 333 and the main body 2. When the door 4 or 6 begins to rotate, the variation of the distance between the main body 2 and the push rack 333 is compensated for by the rack guide 210 formed on the main body 2.

At the same time, the gasket 7 is separated from the door 4 or 6 or the main body 2 by means of the push rack 333.

The lever body 351 of the synchronizer 350 is rotated by the movement of the push rack 333, and the rotational rack 343 is moved by the lever body 351.

Subsequently, the rotational pinion gear 341 engages with the rotational pinion gear 341, and is moved toward the hinge gear 233 by means of the rotational pinion gear 341.

Thereafter, the acceleration gear 346 of the rotational rack 343 engages with the hinge gear 233.

Referring to FIG. 22, the door 4 or 6 is rotated and thus opened by the movement of the rotational rack 343.

At this point, the rotational speed of the door 4 or 6 may be controlled by varying the shapes of the acceleration gear 346 and the hinge gear 233.

The closing operation of the door 4 or 6 is performed in the inverse order of the opening operation thereof.

The closing operation of the door 4 or 6 begins with the rotation of the motor 321 of the drive unit 320 in the direction opposite to the direction of the opening operation of the door 4 or 6.

At this point, the push rack 333 provides a buffering force when the door 4 or 6 comes into contact with the main body 2.

When the load value input through the load detector 420 during the operation of the motor 321 exceeds the predetermined load value, the control unit 370 halts the operation of the motor 321.

FIG. 23 is a flowchart of the method of controlling the door opening and closing device for a refrigerator according to the first embodiment of the present invention.

Referring to FIG. 23, the method of controlling the door opening and closing device for a refrigerator according to the first embodiment of the present invention includes a detecting operation S110 of detecting whether the operation of the motor 321 is halted, a switching operation S120 of disconnecting the motor 321 from the power circuit 401 and connecting the motor 321 to the back electromotive force circuit 402 when the operation of the motor 321 is halted, a reverse switching operation S135 of disconnecting the motor 321 from the back electromotive force circuit 402 and connecting the motor 321 to the power circuit 401 when the predetermined back electromotive force value is detected, and a closing operation S140 of activating the motor 321 to rotate the door 4 or 6 in the closing direction.

In the detecting operation S110, the operation of the motor 321 is detected. Specifically, the detecting operation S110 is performed in such a way that the control unit 370 detects the operation of the motor 321 using a current or voltage measuring device.

The switching operation S120 is performed in such a way as to disconnect the motor 321 from the power circuit 401 and to connect the motor 321 to the back electromotive force circuit 402 when the operation of the motor 321 is halted.

Specifically, when it is determined that the operation of the motor 321 has been halted, the control unit 370 controls the control switch 430 to electrically connect the motor 321 to the back electromotive force circuit 402.

The reverse switching operation S135 is performed in such a way as to disconnect the motor 321 from the back electromotive force circuit 402 and to connect the motor 321 to the power circuit 401. Specifically, when the predetermined back electromotive force value is input from the back electromotive force measuring device 410, the control unit 370 controls the control switch 430 to electrically connect the motor 321 to the power circuit 401.

The closing operation S140 is performed to activate the motor 321 so as to rotate the door 4 or 6 in the closing direction. Specifically, the control unit 370 controls the motor 321 to close the door 4 or 6.

The method according to this embodiment may further include a halting operation of halting the operation of the motor 321.

The halting operation is performed in such a way to halt the operation of the motor 321 when a load value exceeding the predetermined load value during the operation of the door (the opening or closing operation of the motor 4 or 6) is detected.

Specifically, the control unit 370 determines whether the load value input from the load detector 420 exceeds the predetermined load value (S210). Thereafter, the control unit 370 controls the motor 321 to be halted when the load value input from the load detector 420 exceeds the predetermined load value.

The method according to this embodiment may further include an opening operation and an automatic activating operation.

The opening operation is performed to activate the motor to rotate the door 4 or 6 in the opening direction when the door 4 or 6 is opened to the predetermined angle by an external force.

Specifically, the control unit 370 determines whether the door 4 or 6 is opened to the predetermined angle, based on the signal input through the door switch 22 (S170). When it is determined that the door 4 or 6 has been opened to the predetermined angle, the control unit 370 controls the motor 321 to be connected to the power circuit 401 (S175), and then controls the motor 321 to rotate so as to rotate the door 4 or 6 in the opening direction (S180).

At this point, the door rotating mechanism 340 is connected to the drive unit 320 by means of the synchronizer 350.

The automatic activating operation is performed to open or close the door 4 or 6 in response to the input door operating command.

Specifically, when the door opening command is input through the input unit 360 (S150), the control unit 370 controls the motor 321 to be connected to the power circuit 401 (S155). Thereafter, the control unit 370 outputs a control signal corresponding to the door opening command so as to control the door 4 or 6 (S160).

More specifically, the control unit 370 may control the door 4 or 6 to execute one of the opening, closing and halting operations in response to the door opening command.

MODE FOR INVENTION

Various embodiments have been described in the best mode for carrying out the invention. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A door opening and closing device for a refrigerator, comprising:
    a door coupled by means of a hinge unit to a main body including a storage compartment defined therein;
    an opening and closing unit including a drive unit for generating rotational force by means of a motor and a door rotating mechanism for rotating the door using the rotational force of the drive unit so as to open or close the door;
    a back electromotive force measuring device for measuring a back electromotive force value generated in the motor;
    a power circuit connected to a power supply to supply power to the motor;
    a back electromotive force circuit for transmitting back electromotive force of the motor to the back electromotive force measuring device;
    a control switch for selectively connecting the motor to one of the back electromotive force circuit and the power circuit; and
    a control unit for controlling the control switch to be connected to the power circuit when the motor is activated, and controlling the control switch to be connected to the back electromotive force circuit and controlling the motor to open or close the door when the motor is deactivated,
    wherein the control unit controls the door to be rotated in a closing direction when a predetermined back electromotive force is input to the back electromotive force measuring device in a state in which the motor is deactivated.

2. The door opening and closing device for a refrigerator according to claim 1, further comprising a door switch for detecting that the door is opened to a predetermined angle with respect to the main body,
    wherein the control unit controls the door to be rotated in an opening direction when opening of the door is detected by the door switch.

3. The door opening and closing device for a refrigerator according to claim 2, wherein the open and closing unit includes a synchronizer for connecting the door rotating mechanism to the drive unit when the door is opened with respect to the main body to the predetermined angle.

4. The door opening and closing device for a refrigerator according to claim 3, wherein the door rotating mechanism is disconnected from the drive unit when the door is closed.

5. The door opening and closing device for a refrigerator according to claim 3, wherein the door rotating mechanism comprises:
    a rotational pinion gear for transmitting the rotational force of the drive unit; and
    a rotational rack engaging with the rotational pinion gear and moving linearly,
    wherein the rotational rack engages with a hinge gear formed on an outer surface of the hinge unit.

6. The door opening and closing device for a refrigerator according to claim 5, wherein the synchronizer comprises:
    a lever body rotatably coupled to the door or the main body; and
    an elastic member for supplying an elastic restoring force to the lever body,
    wherein the lever body is rotated by the elastic restoring force of the elastic member to cause the rotational rack to engage with the rotational pinion gear.

7. The door opening and closing device for a refrigerator according to claim 6, wherein the rotational rack and the hinge gear are maintained spaced apart from each other when the lever body is rotated by the elastic restoring force of the elastic member.

8. The door opening and closing device for a refrigerator according to claim 7, further comprising:
    a gasket disposed between the door and the main body to provide a hermetic seal therebetween; and a gasket separation mechanism for pushing the main body using the rotational force of the drive unit to separate the gasket from the main body or the door,
wherein the gasket separation mechanism is spaced apart from a hinge shaft of the hinge unit by a predetermined distance.

9. The door opening and closing device for a refrigerator according to claim 8, wherein the gasket separation mechanism comprises:
a push pinion gear for transmitting the rotational force of the drive unit; and
a push rack engaging with the push pinion gear to increase a distance between the main body and the door.

10. The door opening and closing device for a refrigerator according to claim 9, further comprising a rack guide provided on a front surface of the main body so as to guide the push rack,
wherein the rack guide progressively protrudes in a direction of the door as it moves away from the hinge unit.

11. The door opening and closing device for a refrigerator according to claim 10, wherein the synchronizer connects the door rotating mechanism to the drive unit after the gasket has been separated from the main body or the door by the gasket separation mechanism during an operation of opening the door.

12. The door opening and closing device for a refrigerator according to claim 9, wherein the door rotating mechanism is operated after the gasket has been separated from the main body or the door by the gasket separation mechanism during an operation of opening the door.

13. The door opening and closing device for a refrigerator according to claim 1, wherein the back electromotive force circuit includes a back electromotive force distributor for distributing a back electromotive force input from the motor.

14. The door opening and closing device for a refrigerator according to claim 1, further comprising a load detector for detecting a load of the motor,
wherein the control unit halts operation of the motor when a load value input through the load detector during operation of the motor exceeds a predetermined load value.

15. A door opening and closing device for a refrigerator, comprising:
a door coupled by means of a hinge unit to a main body including a storage compartment defined therein;
an opening and closing unit for opening or closing the door with respect to a main body using rotational force of a motor;
a back electromotive force measuring device for measuring a back electromotive force value generated in the motor;
a door switch for detecting that the door is opened to a predetermined angle with respect to the main body; and
a control unit for controlling the motor to open or close the door,
wherein the control unit controls the door to be opened when it is detected by the door switch that the door is opened, and controls the door to be closed when a back electromotive force is detected by the back electromotive force measuring device.

16. The door opening and closing device for a refrigerator according to claim 15, further comprising a memory unit for storing an operation mode of the door, wherein the control unit controls a drive unit in accordance with the operation mode stored in the memory unit.

17. The door opening and closing device for a refrigerator according to claim 15, further comprising an input unit through which a user's opening or closing command is input,
wherein the control unit controls the door to be opened or closed in response to the opening or closing command input through the input unit.

18. A method of controlling an opening and closing device for a refrigerator, comprising:
detecting that operation of a motor is halted;
disconnecting the motor from a power circuit and connecting the motor to a back electromotive force circuit when operation of the motor is halted;
disconnecting the motor from the back electromotive force circuit and connecting the motor to the power circuit when a predetermined back electromotive force value is detected; and
activating the motor to rotate the door in a closing direction.

19. The method according to claim 18, further comprising halting operation of the motor when a load value exceeding a predetermined load value is detected during operation of the motor.

20. The method according to claim 18, further comprising activating the motor to rotate the door in an opening direction when the door is opened to a predetermined angle by an external force.

* * * * *